United States Patent [19]

Salts

[11] 3,958,506
[45] May 25, 1976

[54] APPARATUS FOR PACKAGING CONCRETE BRICK

[75] Inventor: Thomas R. Salts, Amarillo, Tex.

[73] Assignee: Crowe-Gulde, Inc., Amarillo, Tex.

[22] Filed: May 21, 1974

[21] Appl. No.: 471,857

[52] U.S. Cl. .................................. 100/4; 53/198 R; 100/3.7; 100/26; 206/322; 214/6 A; 294/63 R
[51] Int. Cl.² ........................................ B65B 13/18
[58] Field of Search ................. 100/4, 7, 26, 2, 3; 53/198 R; 214/1 BB, 6 A; 206/322; 294/63 R

[56] References Cited
UNITED STATES PATENTS

| | | | |
|---|---|---|---|
| 2,917,991 | 12/1959 | Segur | 100/7 |
| 2,961,810 | 11/1960 | Johnson et al. | 100/2 X |
| 2,986,420 | 5/1961 | Neher | 294/63 R |
| 3,003,296 | 10/1961 | Feldkamp et al. | 100/26 X |
| 3,095,678 | 7/1963 | Cliff et al. | 53/198 X |
| 3,147,692 | 9/1964 | Berner | 100/2 |
| 3,280,725 | 10/1966 | Bartram | 100/4 |
| 3,356,013 | 12/1967 | Konger | 100/3 |
| 3,404,788 | 10/1968 | Thomas et al. | 100/7 X |
| 3,471,036 | 10/1969 | Thomas et al. | 214/6 A |
| 3,480,161 | 11/1969 | Bason | 294/63 R |
| 3,491,901 | 1/1970 | Pearne et al. | 214/6 A |
| 3,834,298 | 9/1974 | Paschal et al. | 100/7 |

FOREIGN PATENTS OR APPLICATIONS

| | | | |
|---|---|---|---|
| 1,077,421 | 7/1967 | United Kingdom | 100/7 |

Primary Examiner—Billy J. Wilhite
Attorney, Agent, or Firm—Ely Silverman

[57] ABSTRACT

Each of a series of small groups of cured bricks, each such group to be joined to others to form a completed hack of such bricks, are automatically handled to stabilize the pressure bearing contact surfaces between adjacent vertical and horizontal surfaces of such bricks in the finished hack and are automatically transported, handled and banded to form a stable bound hack, which hack comprises spaced apart voids for engagement by a forklift truck.

3 Claims, 30 Drawing Figures

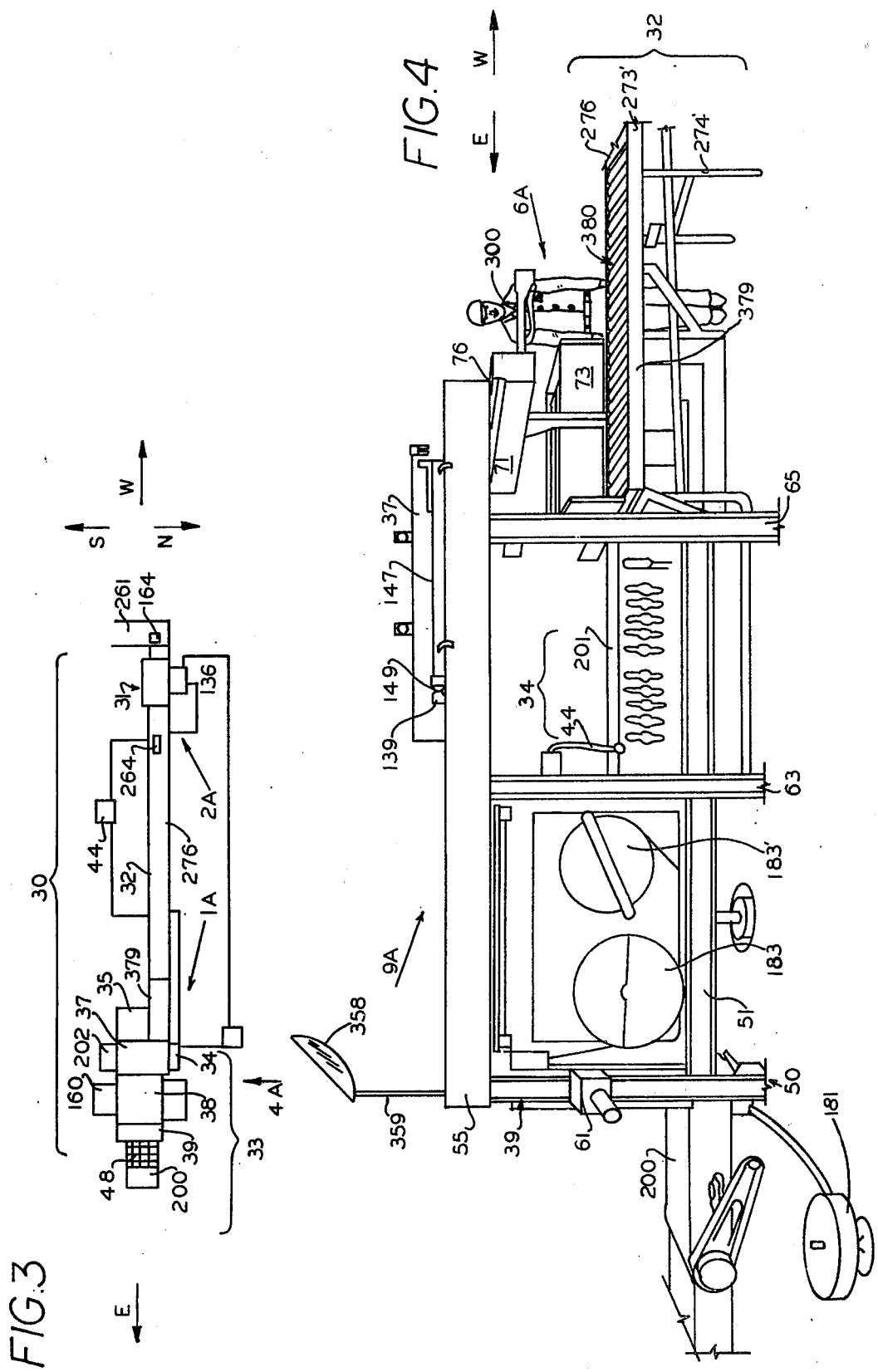

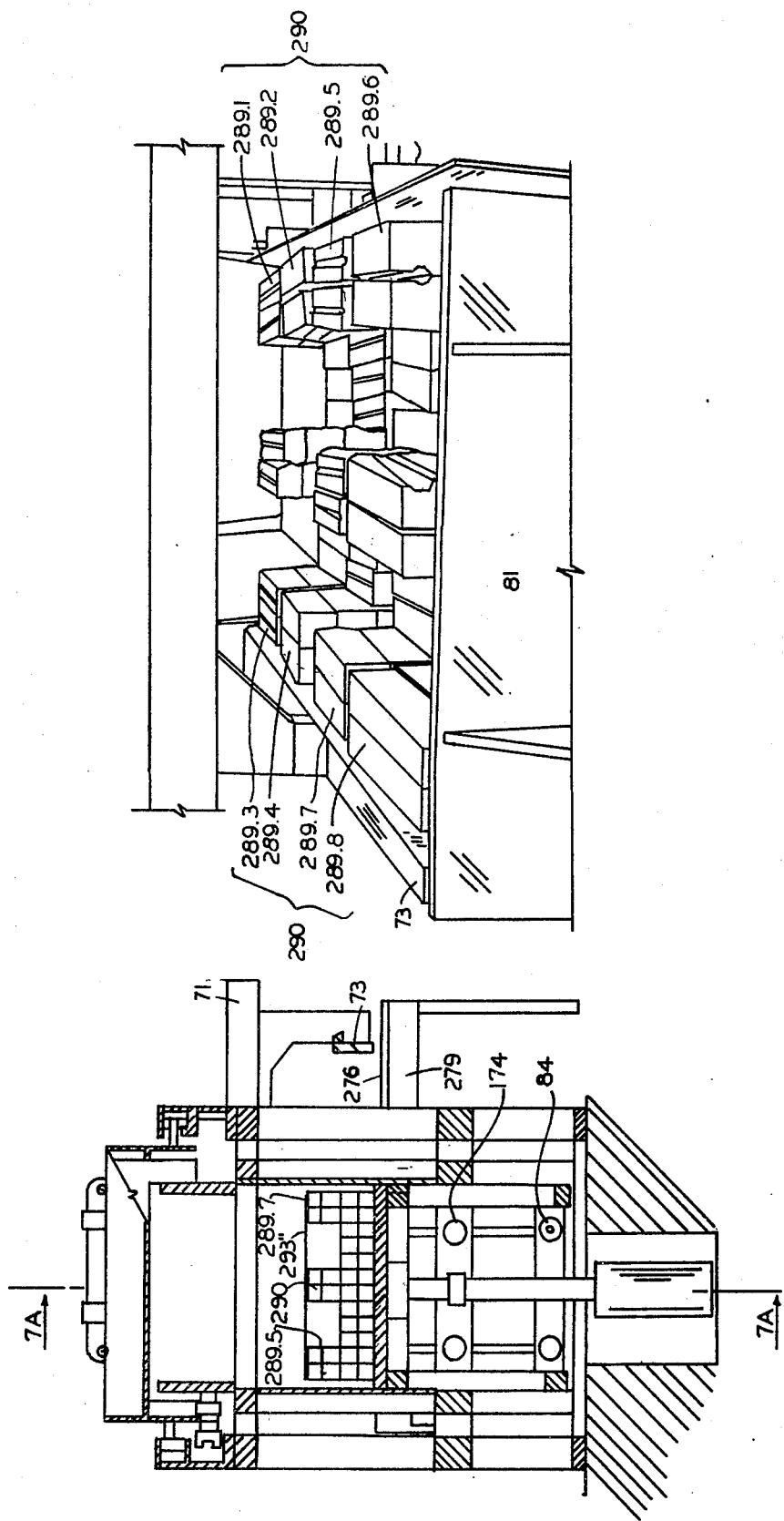

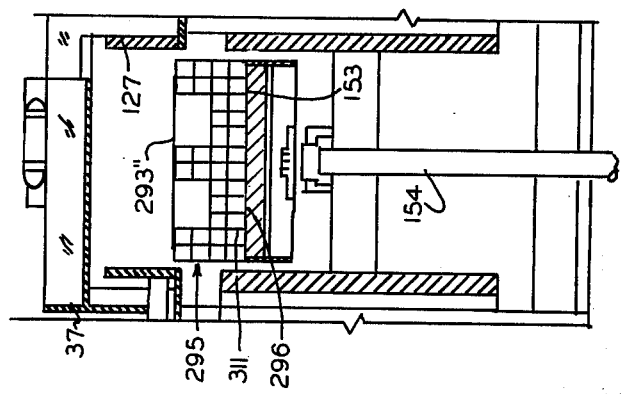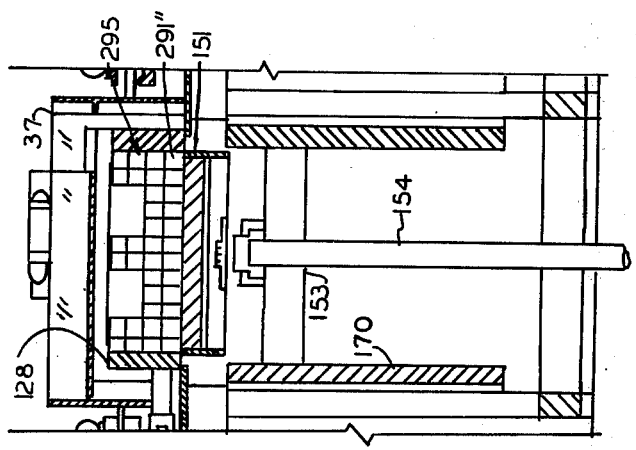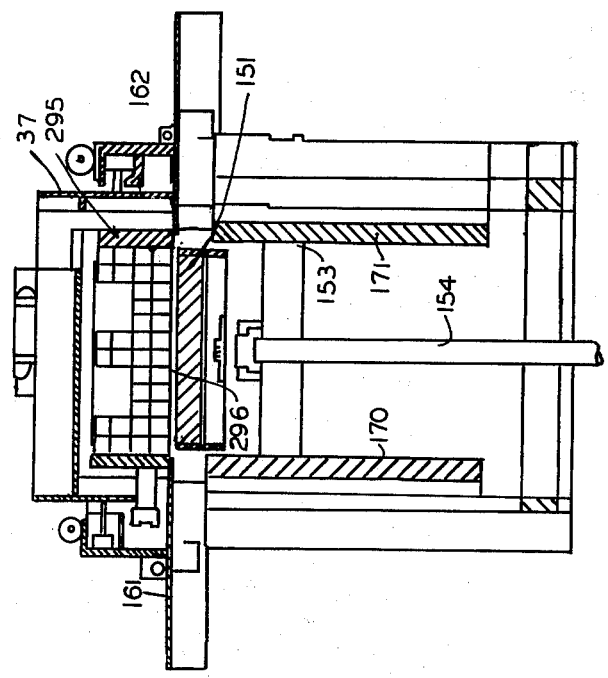

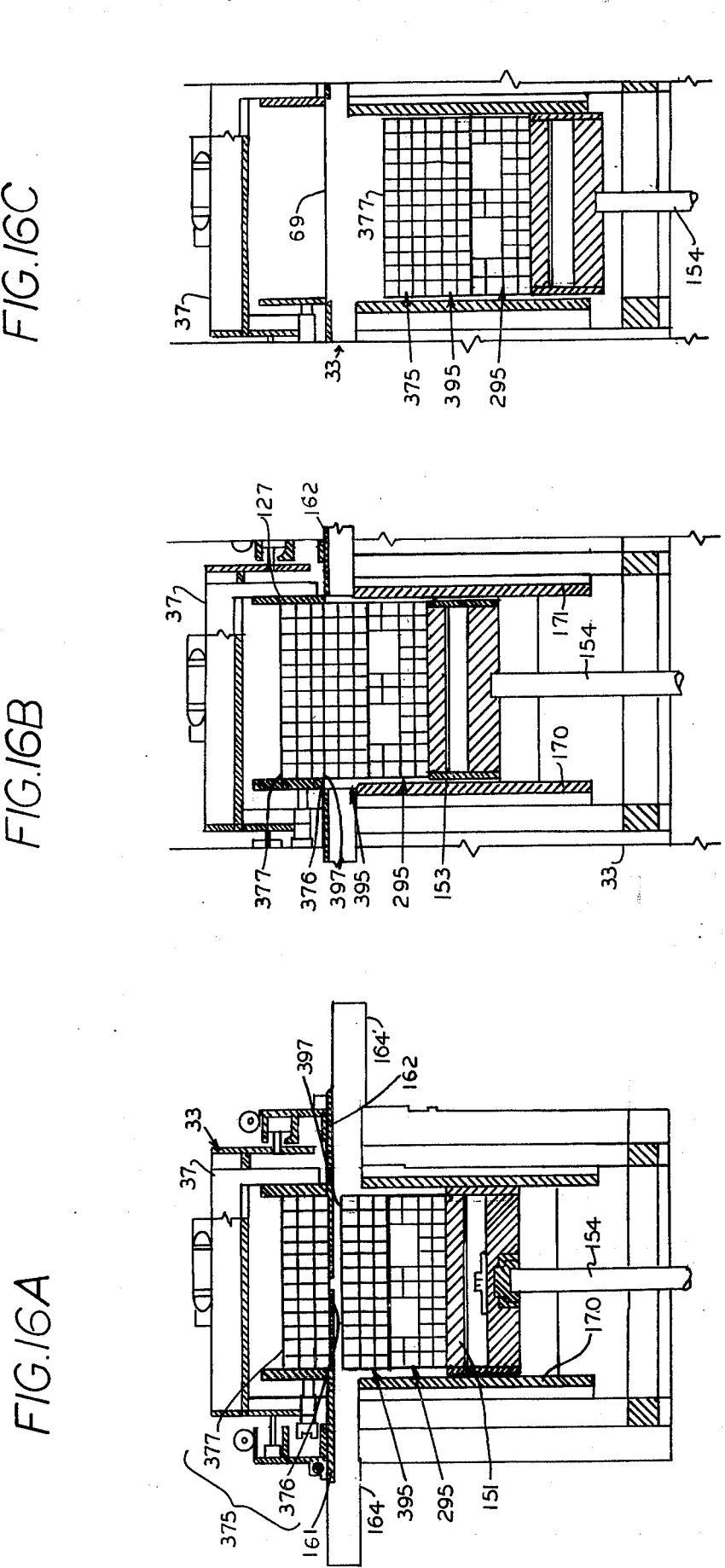

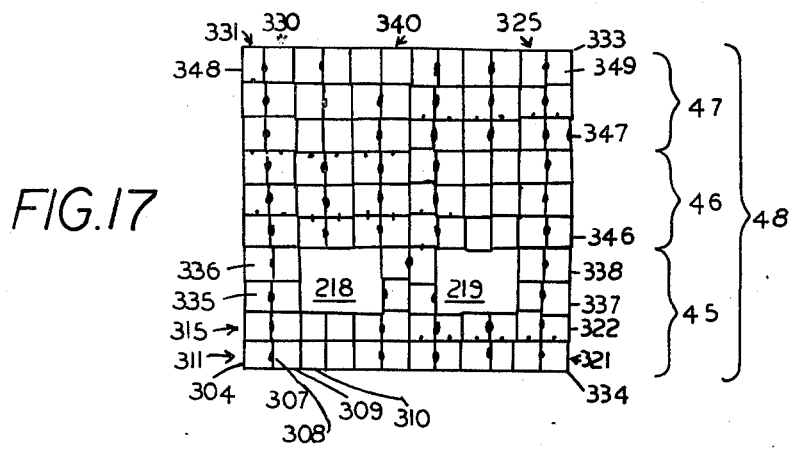
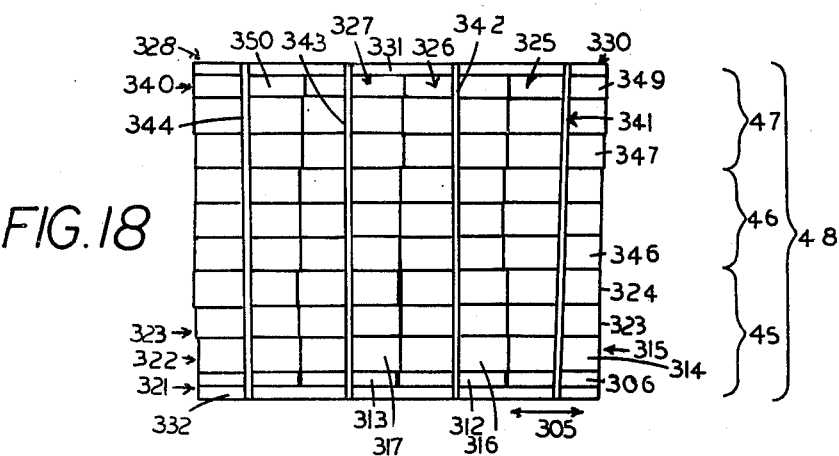
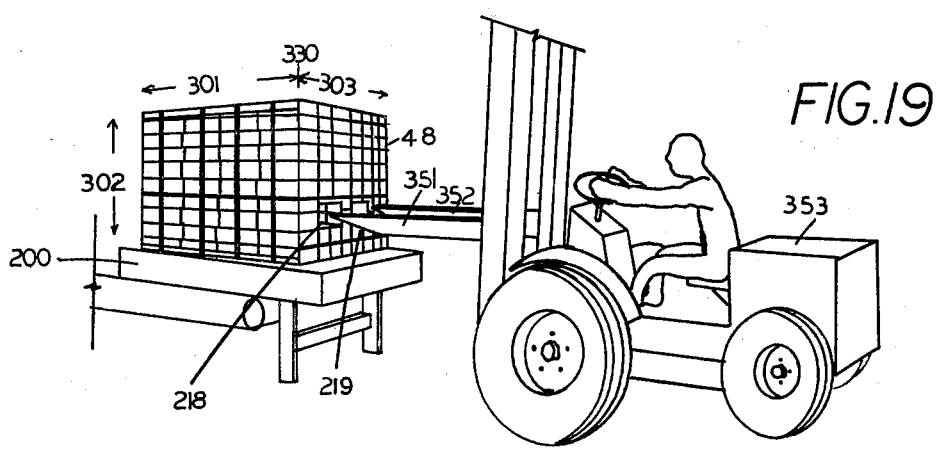

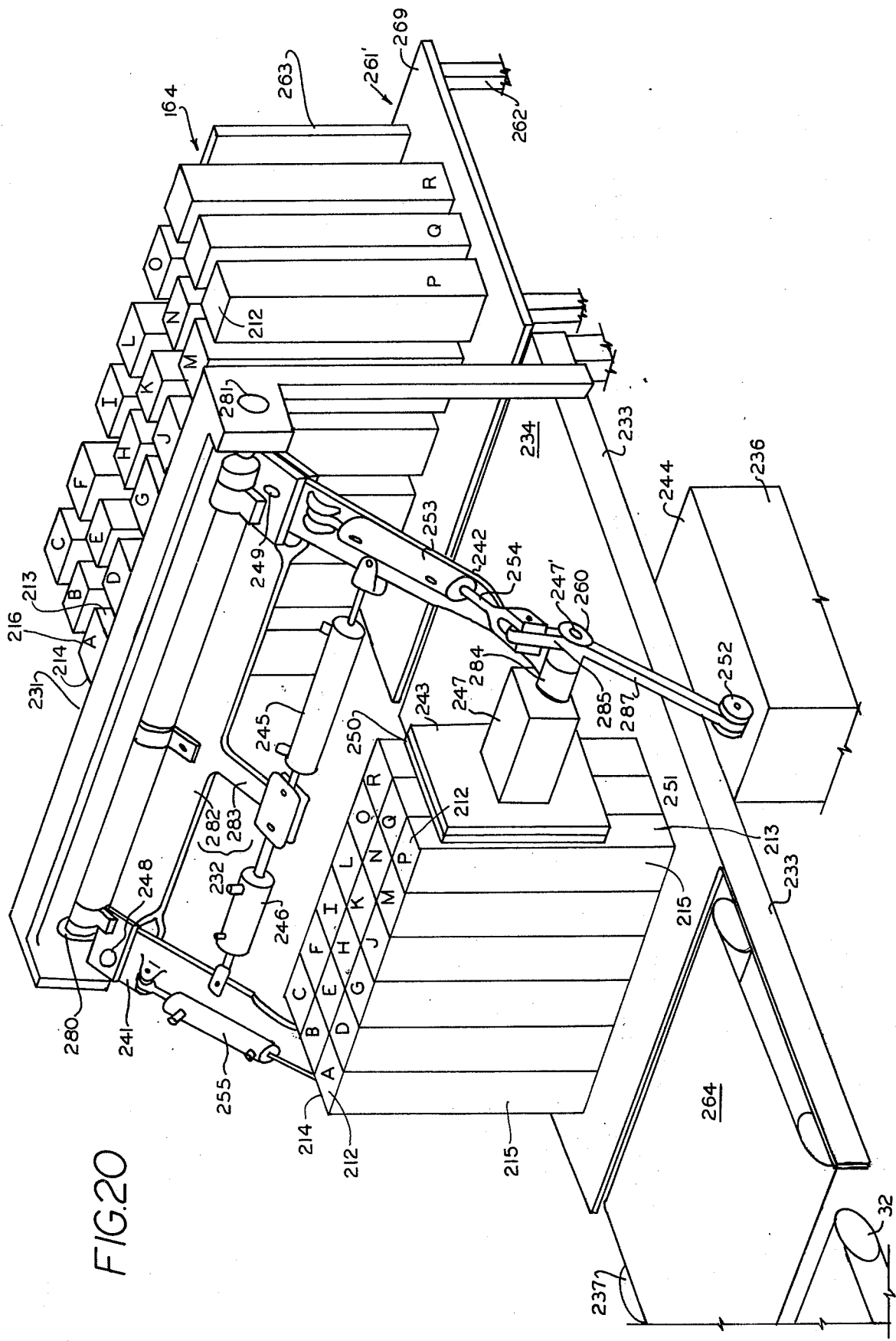

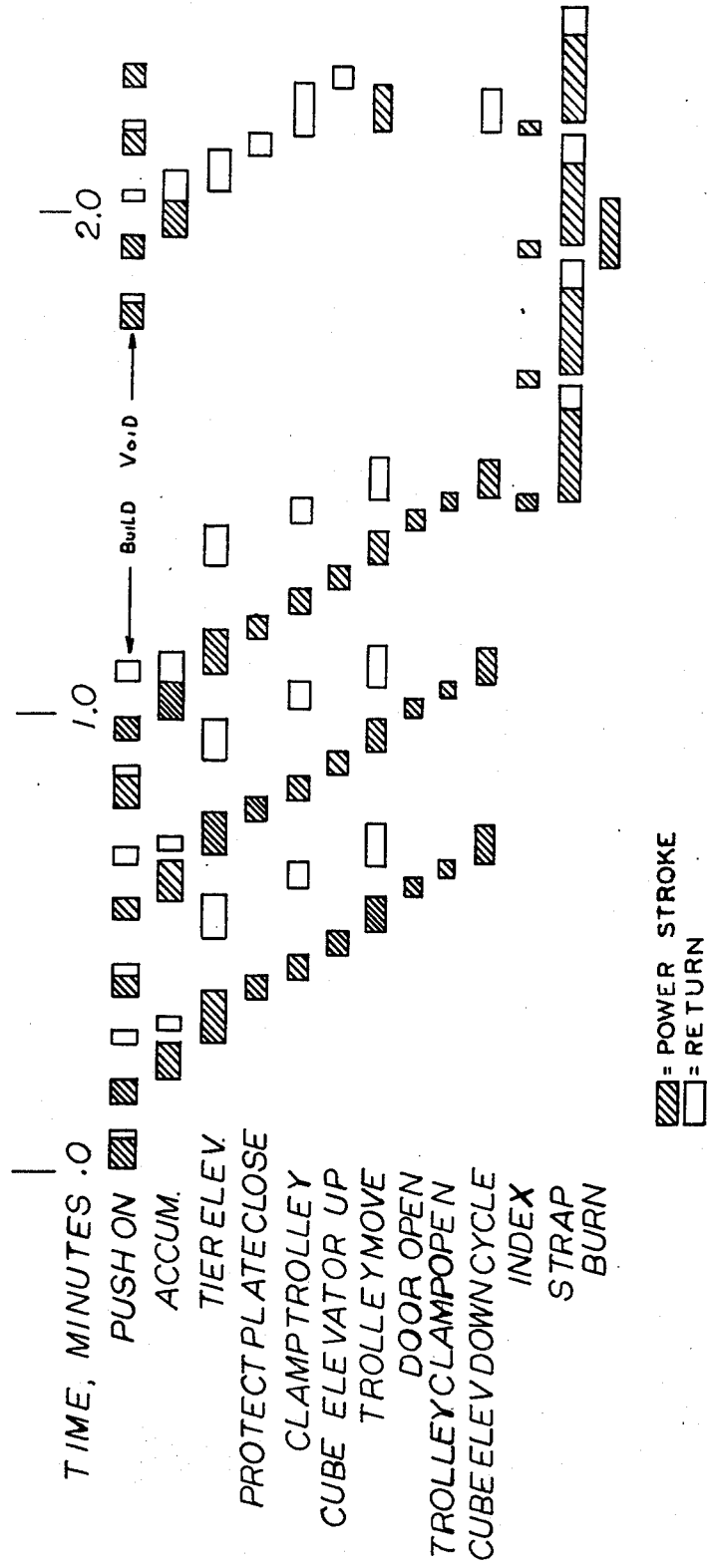

APPARATUS FOR PACKAGING CONCRETE BRICK

BACKGROUND OF THE INVENTION

1. THE FIELD OF THE INVENTION

The field of art to which this invention pertains is brick handling and transportation.

2. DESCRIPTION OF THE PRIOR ART

The transportation of bricks has been largely performed by stacking of such bricks on pallets with handling of such loaded pallets and return or discard of the pallets after transport thereof. The expense of pallets and the inconvenience of their return notwithstanding has resulted in continued use of such method withstanding the availability since 1957, U.S. Pat. No. 2,804,980, of packages comprising a stack of bricks with predetermined rows with voids so that spaces are provided in such stack to receive the forks of a lift truck, as there have been looseness in the resulting packages, as recognized in U.S. Pat. No. 3,148,773 and U.S. Pat. No. 2,986,420 whereby strength of such stacks is maintained by use of transversely located bricks and notwithstanding the availability of mechanical stackers, as in U.S. Pat. No. 3,491,901, 3,480,161 and 3,471,036.

The apparatus of this invention overcomes the problems of looseness of the bands that plague the prior art and not only provides a stable package but also provides packages of uniform mechanical qualities wherein the bricks are all oriented in the same direction while the machine used therefor is compact and safe in operation and is applicable to a wide variety of sizes and shapes of concrete brick and like products.

SUMMARY OF THE INVENTION

The longitudinally extending vertical and horizontal surfaces of bricks to be adjacent to each other in a finished hack of brick composed of a large number of brick are moved parallel to such surfaces (in directions parallel to such surfaces and, for each surface, in directions at right angles to each other) while such surfaces are in contact with each other and while those bricks are in relatively small groups.

Such movement of the brick surfaces against each other serve to remove from those surfaces protuberances which are mechanically weak and would otherwise render the contact between such surfaces mechanically unstable. After removal of such protuberances by such abrading action, the bricks are then confined to limit the movement between such bricks so that such bearing surfaces between those bricks, once created, do not lose their location relative to each other in the finished hack of bricks. The handling of the small groups of which the hack is formed and within which the surfaces of the bricks are treated is scheduled to operate automatically and at a uniform or steady rate so that the brick surfaces of all groups forming a hack of such bricks undergo substantially the same mechanical treatment.

BRIEF DESCRIPTION OF THE DRAWINGS

FIG. 3 is an overall top diagrammatic view of turning assembly 31, conveyor assembly 32 and cubing assembly 33 of apparatus 30.

FIG. 4 is a pictorial view of left side of cubing assembly 33 and discharge end of conveyor assembly 32, as seen along direction of arrow 4A of FIG. 3.

FIG. 5 is a transverse vertical sectional view of cubing assembly 33 along vertical section 5A—5A of FIG. 8.

FIG. 6 is a pictorial perspective oblique view along direction of arrow 6A of FIGS. 4 and 7 of bricks on the accumulator plate, as shown in FIG. 7 in sectional view.

FIGS. 14A, 14B and 14C are a sequence of transverse sectional views as in FIG. 13 showing successive positions of the cubing elevator 150, the protective plate assembly 160 and the mass of bricks subsequently forming the bottom group 45 of the completed hack 48 during period of operation of the apparatus 33 during and following the transfer of that mass of bricks from the trolley clamp to the cubing elevator surface.

Figure 1:
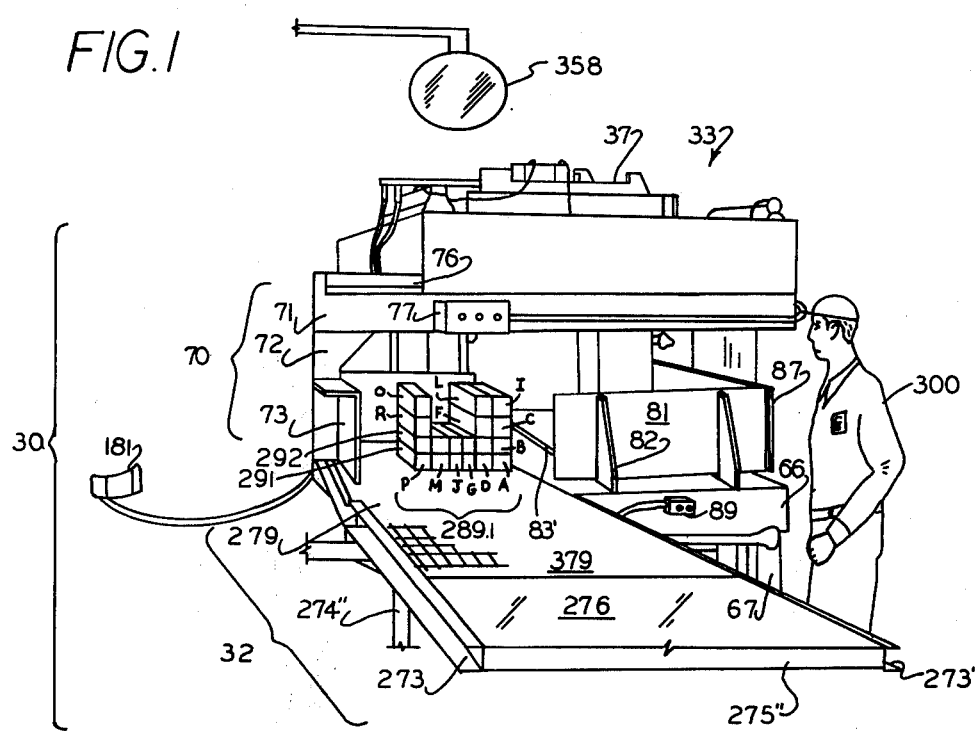
FIG. 1 is a perspective pictorial oblique view along direction of arrow 1A of FIG. 3 of cubing assembly 33 and end of conveyor assembly 32 of apparatus 30.

FIGS. 16A, 16B and 16C are a sequence of vertical transverse sectional views generally as in FIGS. 13, 14A–C and 15A–C showing successive positions of the cubing elevator, the protective plate assembly 160 and the masses of bricks forming the lower group, 45, and the middle group, 46, and the top group, 47, of the completed hack during operation of the assembly 33 to discharge from the trolley and clamp subassembly the mass of brick forming the top group 47 of the completed hack 48.

FIG. 17 is a front view of the hack of bricks 48 formed by the apparatus 30 of this invention.

FIG. 18 is a side view taken along the direction 18A of FIG. 17 to show the relations of the units in the hack of bricks 48.

FIG. 19 is a perspective oblique view of the hack 48 and a forklift in its position engaging and carrying the hack by the fingers of such forklift truck.

Figure 2:
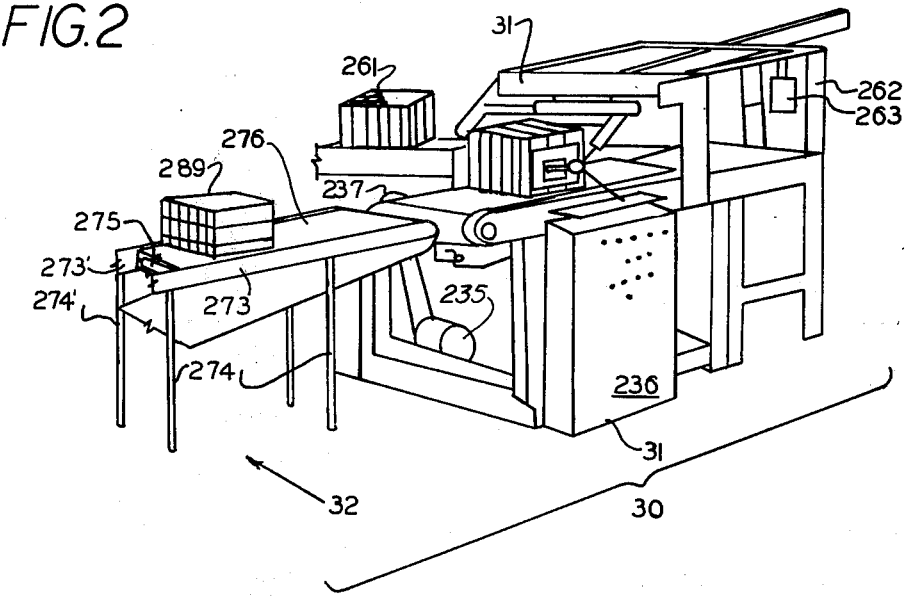
FIG. 2 is a perspective pictorial oblique view of turning subassembly 31 and conveyor subassembly 32 of apparatus 30 as seen along direction of arrow 2A of FIG. 3.

FIG. 20 is an enlarged diagrammatic view of the turning subassembly 31 shown in zone 20A of FIG. 2.

Figure 21:
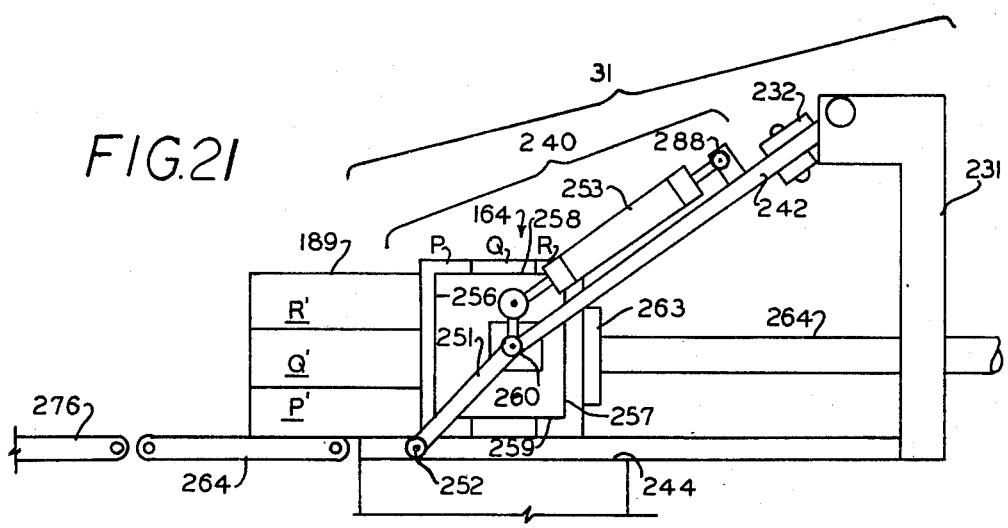
Figure 22:
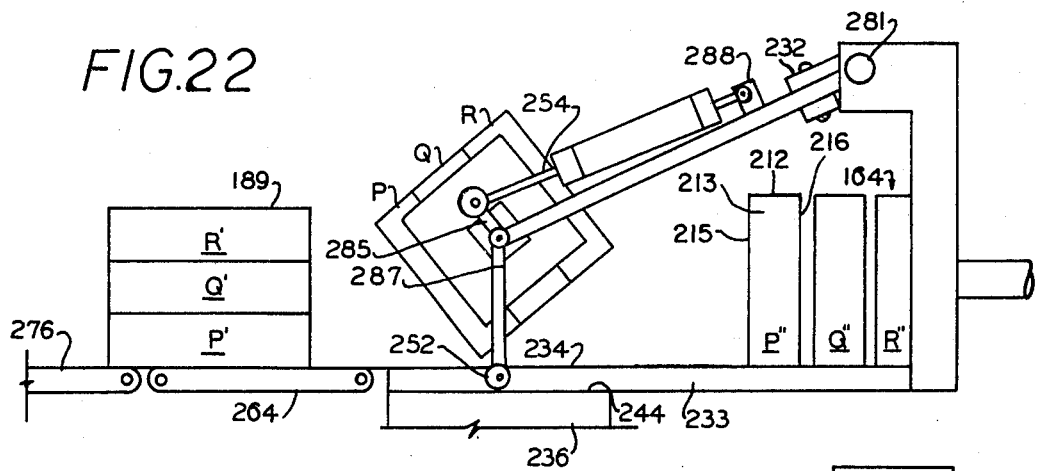
Figure 23:
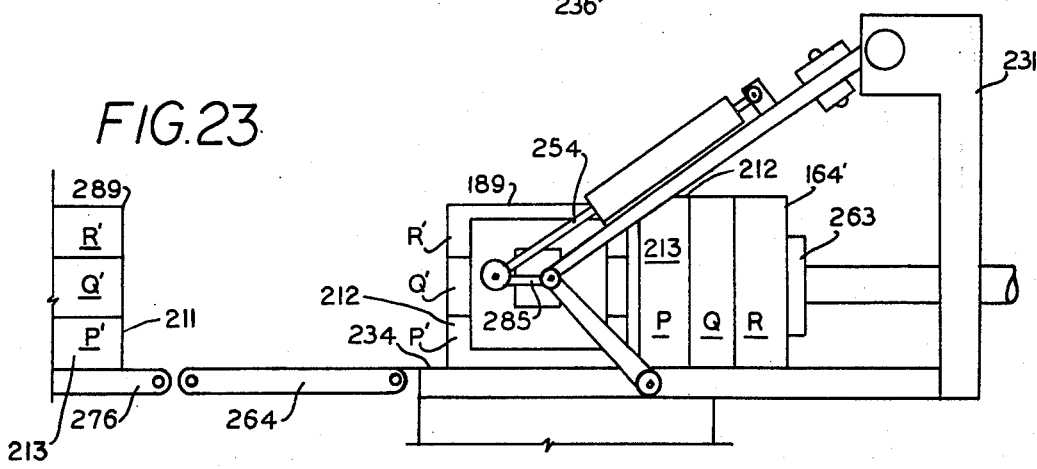

FIGS. 21, 22 and 23 are diagrammatic side views from the right hand side of turning assembly 31 during successive stages of its operation.

FIG. 24 is a diagrammatic representation of the time relations of automatic actuation of the subassemblies of assembly 33.

DESCRIPTION OF THE PREFERRED EMBODIMENT

The apparatus 30 of this invention comprises a turning assembly 31, a conveyor assembly 32, and a cubing assembly 33. The cubing assembly, in turn, comprises, in operative combination, an accumulator subassembly 35, a tier elevator subassembly 36, a trolley and clamping subassembly 37, a cubing elevator subassembly 38 and a banding subassembly 39. The subassemblies 35–39 are firmly located on a cubing assembly frame 50.

Feed to the Assembly 30

Figure 10:
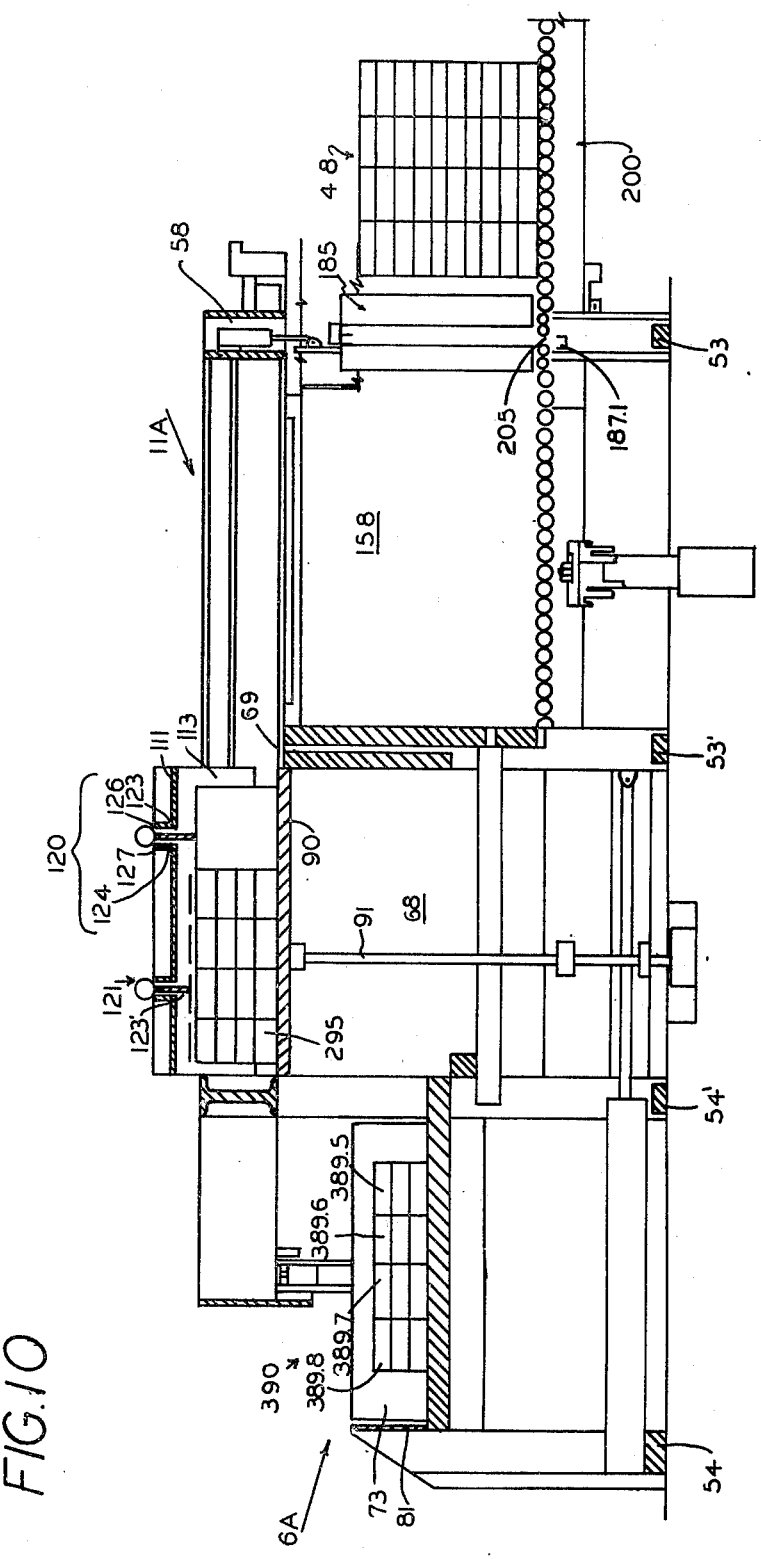
FIG. 10 is a vertical longitudinal sectional view of the apparatus 33 like the views of FIGS. 7 and 8 in a stage of operation subsequent to that shown in FIG. 8 wherein the tier elevator plate 90 is raised and the cubing elevator back plate 172 is returned to its rearward position and the accumulator blade 81 has been returned to its load accepting position.

The concrete bricks of the arrays (164) fed to apparatus 33 are initially formed in forms as in U.S. Pat. No. 3,621,086 issued Nov. 16, 1971, and U.S. Pat. No. 3,425,105 issued Feb. 4, 1969. Such concrete bricks are each slightly wider and deeper at the bottom that at the top and are driven to a conveyor that carries them to a kiln from which they are discharged as a plurality of vertically extending cured prisms, A–R As shown in FIG. 20. Each such prism (as A and P) has a larger lower end surface 211, an upper smaller end surface 212, a north vertical face 213, a south vertical face 214 and an East Vertical face 215 and a west face 216; faces 213, 214, 215 and 216 are vertical and faces 211 and 212 are horizontal in the position shown in FIG. 20. The blocks A-R are separated by the width of the forms in which made — as shown in FIG. 10 of U.S. Pat. No. 3,425,104 — when formed and cured and at position shown as 164 in FIG. 1 and when fed to the turning assembly 31 but are brought into face-to-face contact, as shown in FIG. 20 when in turning assembly 31, where they are turned so that the end faces 211 and 212 are vertical. After such turning, as in FIGS. 20–23, the blocks travel from subassembly 31 to cubing assembly 33 along the conveyor 32 and during such travel the adjacent vertical faces of neighboring bricks as A and D, B and E, C and F, D and G, E and H, F and I are moved vertically with respect to each other and effect abrasion of the contact zones between such vertical faces to such an extent that the resultant powder discharged at the end of the conveyor belt 276, as shown in FIG. 4 accumulates in quantities of about 2 inches deep every four hours of operation of turning assembly 31 and conveyor assembly 32.

The Turning Assembly 130

The turning assembly 31 comprises a main turning assembly frame 230, a pivotal clamp assembly 240, and a control assembly 236. The turning assembly frame 230 comprises an upper transversely extending rigid clamp support frame 231 and a lower base and support frame 233. The base support frame 233 is firmly joined to and supports clamp support frame 231. Frame 233 is a rigid open rectangular frame firmly supported on the ground and supports base plate 234, motor 235, a horizontally extending conveyor belt 264 and a control assembly 236. Frame 231 is generally in the shape of an inverted square U, as shown in FIGS. 2 and 20.

A pivotal clamp assembly motor 235 is supported on the frame 233 and operatively connected to a drive roller 237 at the front end of the conveyor belt 264. The motor 235 and the hydraulic pistons of assembly 31 such as 245, 246, 253 and 255 are controlled by a control panel 236 which panel is operatively connected to a source of electrical power by electrical power lines 238 and to a source of hydraulic power by conventional hydraulic line pair 239.

A rigid, T-shaped pivotally movable bracket 232 comprises a rigid horizontally extending arm 282 forming the cross of the T, and a longitudinally base portion 283; the arm 232 is pivotally attached by pivotal hinges 280 and 281 for pivotal motion relative to the upper, transversely extending portion of the support frame 231. A left clamp arm 241 and a right clamp arm 242 are rigid plates that are pivotally attached to the lateral ends of the cross arm 282 of the tee bracket 232 as at left and right pivotal bracket supports 248 and 249, respectively. Pivotally mounted vertical rigid left and right square clamp plates 243' and 243 are each respectively firmly supported on pivotally supported rigid cylindrical plate axle as 247 for plate 243; each plate axle 247 is rigidly fixed at its central end to the outer vertical surface of a clamp plate, as 243, and has a laterally extending outer cylindrical horizontal shaft 247' that is pivotally supported, for rotation about a horizontally extending axis, in a journal 284 firmly attached to the lower end of right clamp arm 242 and projecting centrally therefrom, as shown in FIG. 20, and a similar left plate axle is attached to a journal at the bottom end of left clamp arm 241 and is co-axial with shafts 247' and 247.

One end of a lateral horizontally extensible right piston cylinder and shaft assembly 245 is pivotally attached to the right clamp arm 242 and its other end is pivotally attached to the arm 283 of the tee 232 and a lateral horizontally extensible left piston cylinder and shaft assembly 246 is pivotally attached at one end to the left clamp plate 241 and at its other end to the arm 283 of tee 232. A journal 259 at apex of a right V-shaped plate control crank arm 251 on the right side of plate 243 is firmly yet pivotally to lateral portion of plate axle 247 and the bottom end of plate control arm 251 is firmly yet rotatably attached to a supporting roller 252 therefor; roller 252 has a horizontally extending central longitudinal axis parallel to axis of cylindrical portion of shaft axle 247 and is in rolling contact with a smooth flat rigid horizontal roller support plate 244 that is firmly attached to and supported on frame 233; the upper rigid arm portion 285 of arm 251 is firmly attached at its lower end to pivotally mounted journal 259 and controls movement of lower portion 287 of arm 251.

One, upper, end of the right control piston cylinder 253 is pivotally attached to a vertically extending lug 288 on right clamp plate 243. A piston shaft 254 is longitudinally movable in cylinder 253 and extends to and is pivotally attached to upper end of arm 285. A left control piston cylinder 255 is provided with a extensible piston shaft that is similarly attached to the left plate axle for the left turn assembly clamp plate 243'.

The clamp plates as 243 and 243' are alike in size and shape, each being a square rigid steel plate with a firm flat rubber facing sheet as 250 on plate 243 on its interior face. The size of the plates as 244, as shown diagrammatically for plate 243 in FIGS. 20, 21, 22 and 23, is such that the front edge as 256, rear edge, 267, top edge 268 and bottom edge 269, as shown in FIGS. 20–23, are near to the edge of the brick mass as 164, but are not as widely spaced apart as the extreme edges of the mass of brick, as 164, grasped thereby, i.e. the bottom edge 269 of plate 243 (and bottom edge of plate 244) is located above the base plate 234. Conveyor 264 is supported on frame 233 with its upper surface coplanar with and parallel to and same width as base plate 234.

The Conveyor Assembly 32

The conveyor assembly 32 comprises a longitudinally extending frame 272, a belt 276 and conveyor motor 277 and control panel 270. The frame 272 in turn is comprised of a pair of parallel horizontally extending roller support beams as 273 and 273'. Each of the beams as 273 is supported on a plurality of like vertical supports as 274 and 274' and 274'' firmly attached to such horizontal beam; and like vertical members are provided for support of the other horizontal beam 273'. A large number of like equally spaced parallel rollers as 275, 275' and 275'' are positioned transversely of the beam members 273 and 273' along the length of those beams and are relatively closely spaced but not contiguous. The rollers as 275 support a conveyor belt 276 thereon and a drive pulley at the discharge end 279 of the belt drives the belt 276. The control panel 236 is operatively connected to a source of electrical power and to the drive motor 277 which motor is operatively connected to the drive pulley for the belt 276. The feed end 278 of the conveyor assembly 32 is located adjacent to and at the same vertical level as and parallel to the discharge end of the conveyor 264 of the turning assembly 30, as shown in FIGS. 2 and 20. Thereby the bricks discharged from belt 264 of turning assembly 30 are passed to the belt 276 of conveyor 32.

For purpose of consistent reference in the embodiment of apparatus and process herein described, the turning assembly 31 is at western end of assembly 30 and the conveyor belt 32 extends eastward to cubing assembly 33 and trolley assembly 37 of cubing assembly moves in east-west direction. The conveyor 261 extends from a kiln on its south end northward to a location adjacent assembly 31.

Operation of Assemblies 31 and 32

In operation of the assembly 31, the hydraulic pistons 245 and 246 are first expanded to separate the clamp plates 243 and 244 to their maximum lateral spacing. The discharge conveyor 261 of a block producing system carrying thereon cured concrete bricks or blocks from kilns that have treated the discharge of a block making machine as in U.S. Pat. No. 3,425,105, issued to C.J. Gulde or in U.S. Pat. No. 3,799,716 issued to T. Salts, places the vertical cured and spaced apart concrete bricks 164, at the discharge end 261' of the conveyor 261 adjacent to the feed end of the base plate 234 of unit 31 (see FIG. 20). An operator directs a horizontally movable rigid flat vertical conveyor discharge plate 263 operatively attached to frame 262 of conveyor 261 to move an array of longitudinallly and transversely spaced apart bricks, as 164 (in FIG. 20) from a pallet 269 therefor to the co-planar flat horizontal base plate 234; as shown in FIG. 23, such longitudinally compressed mass of longitudinally moved and longitudinally adjacent bricks — 164' — will displace any mass of brick — as 189 — theretofore on plate 234 and move it horizontally to a rapidly moving conveyor 264, as shown in series of FIGS. 23—21—22. Such displaced brick mass 164' is rapidly removed from plate 234 by conveyor 264 and transferred to conveyor 32. Such longitudinal movement of the mass 164 moves the bricks spaced apart as shown for P, Q and R (and J, K and L), shown in FIG. 20, together but does not effect the transverse spacing of bricks as R and O or Q and M (prior to location of such bricks between the clamping plates 243 and 243' of assembly 31).

The mass of bricks 164 is thus located on the base plate 234 between the clamps 243 and 243' with the central longitudinal axis of axle 247 passing through the center of mass of the brick mass 164 located between the plates 243 and 243'. Plates 243 and 243' are equally sized, parallel, of same outside shape and interior structure and have their front, rear, top and bottom edges parallel to each other. Actuation of the shafts of the piston cylinder 245 and 246 drives the lower end of arms 241 and 242 and brings plates 243 and 243' together to grasp the mass of bricks therebetween and transversely compress it to remove transverse spacing between blocks A–R, as shown in FIG. 20. This movement of arms 241 and 242 is under control of an operator acting on control panel 236.

As the movement of piston shafts of piston cylinders 253 and 255 cause the arm as 251 to pivot about axis of shaft 247 and shaft 247 is firmly attached to plate 243 and arm 287 is sufficiently longer than the distance from center of mass 164 to the point of contact of roller 252 on surface 244 in position shown in FIGS. 21 through 23, actuation of the hydraulic pistons 253 on the right side of assembly 31 by control panel 236 and similar actuation of similar apparatus on the left side (illustrated in FIGS. 21, 22 and 23 for the right side only, as the left side is a mirror image thereof) lifts the transversely compressed mass of bricks on arms as 251 and roller as 252 on plate as 244 and raises the axle plates and mass 164 clearly above plate 234 and rotates such plates and mass 90° about a horizontal axis, as shown in FIGS. 21 to 23, while conveyor piston plate 263 is moved rearwardly and then forwardly (as shown in FIGS. 21 and 22 and 23) to receive and act on another load of bricks as 164 (shown as P'', Q'', R'' in FIG. 22). After such repositioning of bricks P, Q, R, as P', Q' and R' (FIG. 23) actuation of the hydraulic piston cylinder and shaft assemblies 245 and 246 spreads apart the plates 243 and 243' and the mass of bricks theretofore held by plates 243 and 243' is released upon the plate 234 with the longitudinal axis of each of such bricks then horizontal, as shown in FIG. 23.

Figure 8:
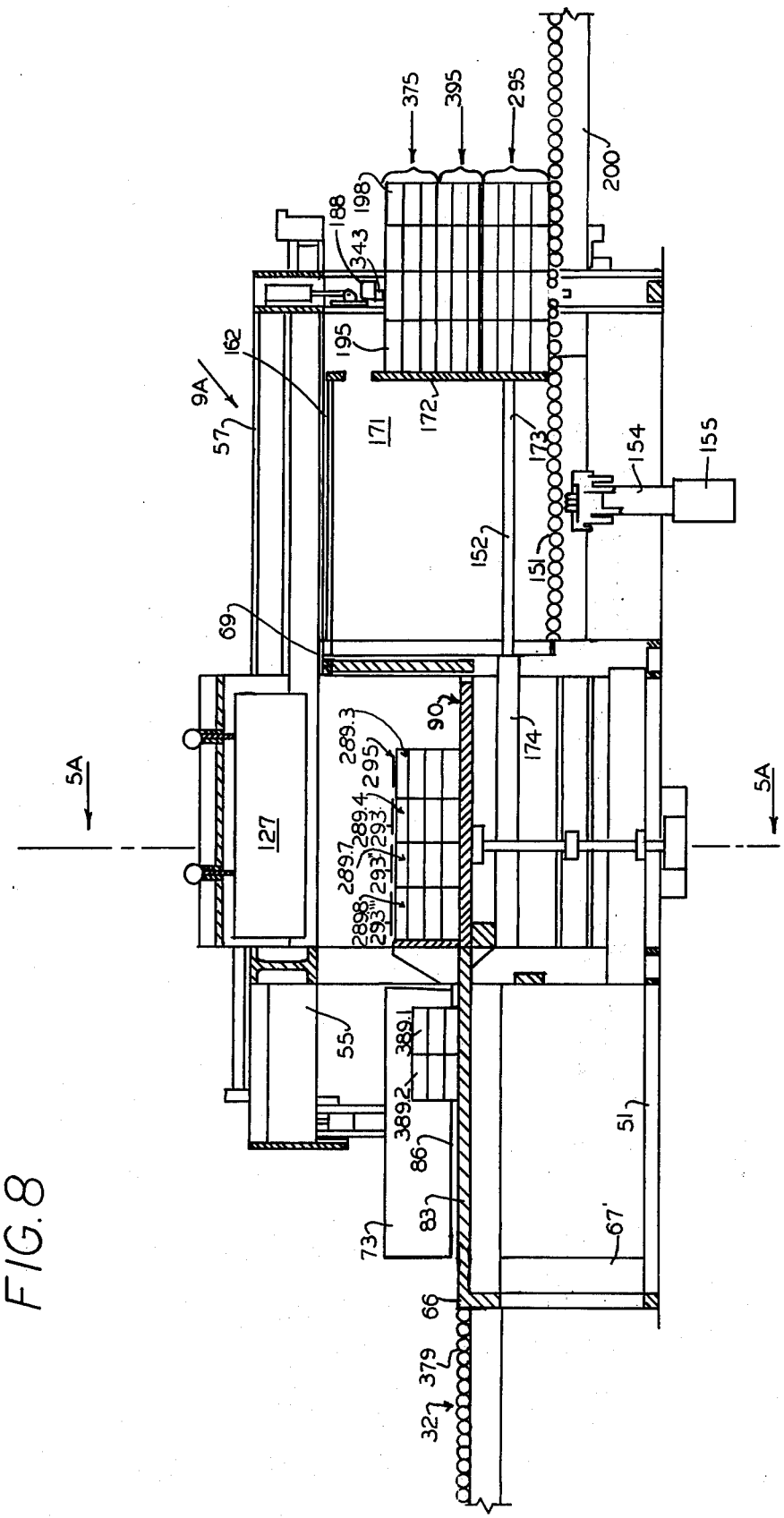
FIG. 8 is a diagrammatic vertical central longitudinal sectional view, as shown in FIG. 7 in a stage of the cycle of operation of the apparatus 33 one full step advanced past that stage shown in FIG. 7 and wherein the accumulator is unloaded and a mass of brick is transferred to the tier elevator.

The thus turned mass, shown as 189 in FIG. 23, is discharged by conveyor 264 onto the conveyor 276 of the conveyor assembly 32; such mass of compressed, turned and conveyed bricks is there shown as 289. After travel to conveyor end 279, as shown in FIGS. 1 and 8, the individual bricks of the mass as 289 have their longitudinal axes only approximately parallel, as such bricks are slightly wider at one end than the other. However, the horizontal surfaces between vertically adjacent bricks of the mass 289 as P', Q' and R' are then in contact with each.

The subsequent charging of further bricks as shown in FIG. 23, to plate 234 moves the then horizontally elongated brick to conveyor 264 and thence to belt 267 of assembly 32, as shown in FIGS. 21–23 for the mass 164.

The Cubing Assembly 33

The accumulator subassembly 35, the tier elevator subassembly 35 and trolley and clamp subassembly, 37, cubing elevator subassembly 38 and banding assembly 39 operate concurrently and cooperatively and synergistically as well as that subassemblies 35–39 are located on a common frame, 50 and controlled by a common automatic sequential control assembly 34.

The frame 50 is composed of a rigid horizontal bottom frame 51 and a rigid upper horizontally extending frame parallel thereto, 55, and spaced away therefrom. The bottom frame 51 is a rigid horizontally extending rectangular flat frame with bottom straight left rigid side member 52, a rigid right frame member 52', a transversely extending front member 53, a transversely extending rear member 54 and transverse members 53' and 54' therebetween.

Figure 7:
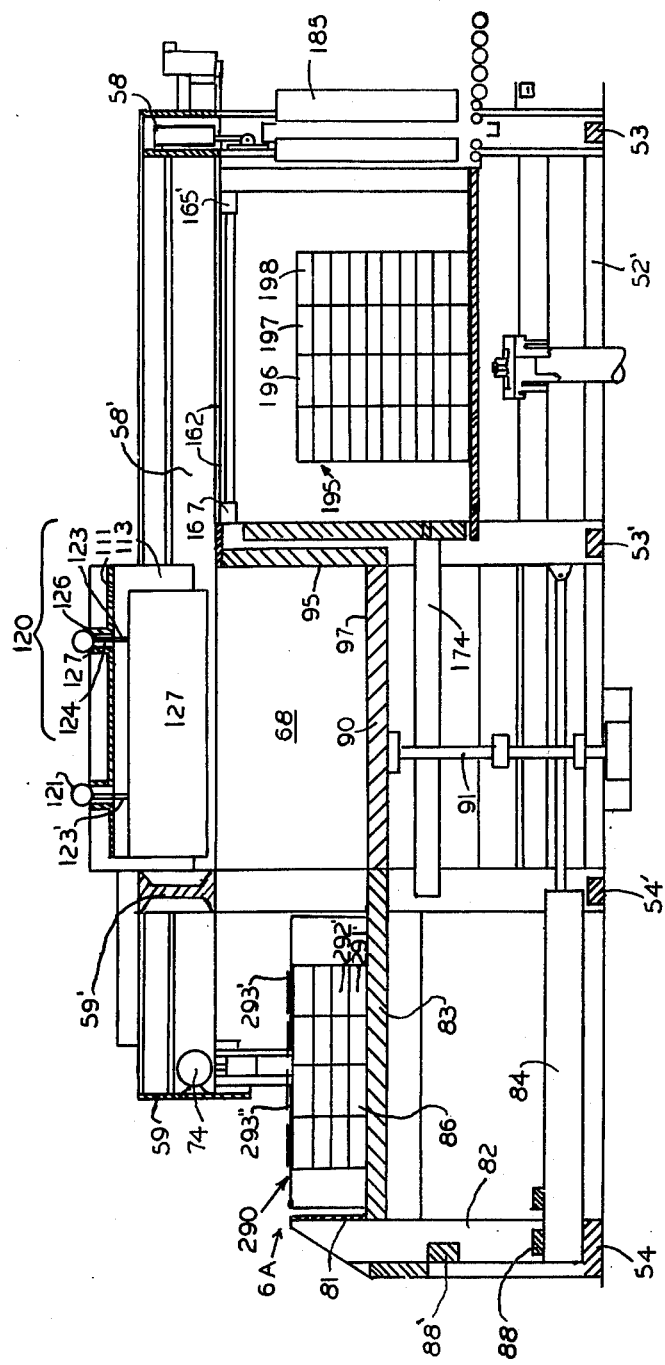
FIG. 7 is a diagrammatic vertical central longitudinal sectional view of the apparatus taken through the plane 7A—7A of FIG. 5 in a first stage of operation of assembly 33.

The upperr frame comprises a horizontally extending lefthand member 56 and, parallel thereto, an upper frame right hand member 57, a transverse front member 58, a transverse rear member 59 and intermediate transverse members 58' and 59', as shown in FIG. 7. The upper and lower frames are joined by rigid vertical front left support member 60, front right member 61 and intermediate member 62 on the left side 63 on the right side, a rear right vertical post 65 and a rear left post 65. A horizontal accumulator plate backing member 66 is supported by a left vertical accumulator plate backing post 67 and a right hand member 67'. Frame 51 and 55 are firmly joined together by these transverse and vertical members.

The accumulator subassembly 35 comprises a push-on subassembly 70 which comprises a push-on blade 73 which is a rigid vertical rectangular steel plate which is firmly attached to and supported on a rigid guide arm 72 and is movable in a transverse direction while slidably supported in a rigid slide 71 and actuated by a piston 74. The slide 71 is rigid straight horizontal member of a C-shaped transverse section downwardly open, which is firmly fixed at its top to the upper frame 55. The piston 74 (FIG. 7) is firmly attached to the upper frame 55. Actuation of the piston shaft 76 located movably within the piston cylinder 74 provides for rectilinear movement of the guide plate 73 with its bottom edge slightly (i.e., about ½ to 1½ inch) above the discharge end of conveyor 32 and parallel thereto, as shown in FIG. 1 and above the accumulator plate 86 and parallel thereto, as shown in FIGS. 4, 7 and 10. Blade 73 is moved by hydraulic piston attached thereto under control of conventional hydraulic control switch 77 from the rightwardly extending position shown in FIGS. 1 and 5 to the contracted leftward position shown in FIG. 6 to move bricks from discharge end of conveyor 32 as in FIGS. 1 and 8, to the accumulator plate 86, as shown in FIGS. 6 and 7.

The accumulator subassemblly 35 also comprises not only the push-on subassembly 70 but also the tier elevator loading subassembly 80. Tier elevator loading subassembly 80 comprises a horizontally movable flat vertical rigid accumulator blade, 81, support plates 82 and 82', pistons 84 and 84' therefor, and a flat accumulator plate 86. Plate 86 is a rigid slotted plate assembly with an upper flat smooth horizontal surface. The plate 86 is firmly supported by and attached to frame 50 by its members 67, 67', 64 and 65 and strong members therebetween. The upper surface of plate 86 is at the same vertical level as the top of discharge end (279) of conveyor assembly and has longitudinally extending slots 83 and 83' each of a width that is so small relative to the bricks passing thereover that such bricks pass over the slots (83 and 83') smoothly and without interference.

The tier elevator loading assembly comprises a vertically extending flat rigid accumulator blade 81 firmly attached to a pair of rigid support plates 82 and 82'. The support plates 82 and 82' are movable horizontally from the rear (as shown in FIG. 1) of flat rigid horizontal plate 86 to the front (as shown in FIG. 1) along slots 83 and 83' in the accumulator plate 86. The accumulator piston cylinders 84 and 84' are firmly located adjacent to the bottom of the frame 50 as shown in FIGS. 8, 7 and 5. Two such pistons are provided. Each piston cylinder is firmly attached to an accumulator blade support plate frame and serves to move the blade 81 from the expanded, rear position of FIG. 7 to its retracted forward position shown in FIG. 8.

The portions of the plate 86 on each side of and between the slots 83 and 83' are firmly supported on members of the frame 50 and rigid horizontally extending members extending therebetween and firmly attached thereto, e.g. 86a.

A vertically extending rigid stop plate 87 is firmly attached to the left (as viewed in FIG. 5, right side as viewed in FIG. 1) edge of plate 86; it extends parallel to slots 83 and 83' and parallel to plane of push-on blade 73.

The piston cylinders 85 and 85' are parallel to each other and firmly located relative to each other by bars 88 and 88' and are supported by rollers on rigid longitudinal members of frame 50.

The tier elevator subassembly 36 comprises a tier elevator plate 90 which is a rigid plate with a top flat smooth horizontal surface 97. The plate 90 is firmly attached to and supported on a vertically extending piston shaft 91 which is coaxial with and supported by and movable along a hydraulic piston cylinder 92 which cylinder is mounted in the ground in a well 96 below the tier elevator. The tier elevator is located between the vertical posts 63 and 65 and such posts define front and rear of a tier elevator chamber 68; tier chamber right side wall 93 and the left side wall 94 are smooth rigid steel plates firmly attached to lateral ribbing elements; the ribbing elements are firmly yet adjustable attached to frame 50 to accomodate different widths of hacks to be formed. A flat vertical front wall 95 is a rigid steel sheet firmly joined to the frame members 62 and 63.

Figure 11:
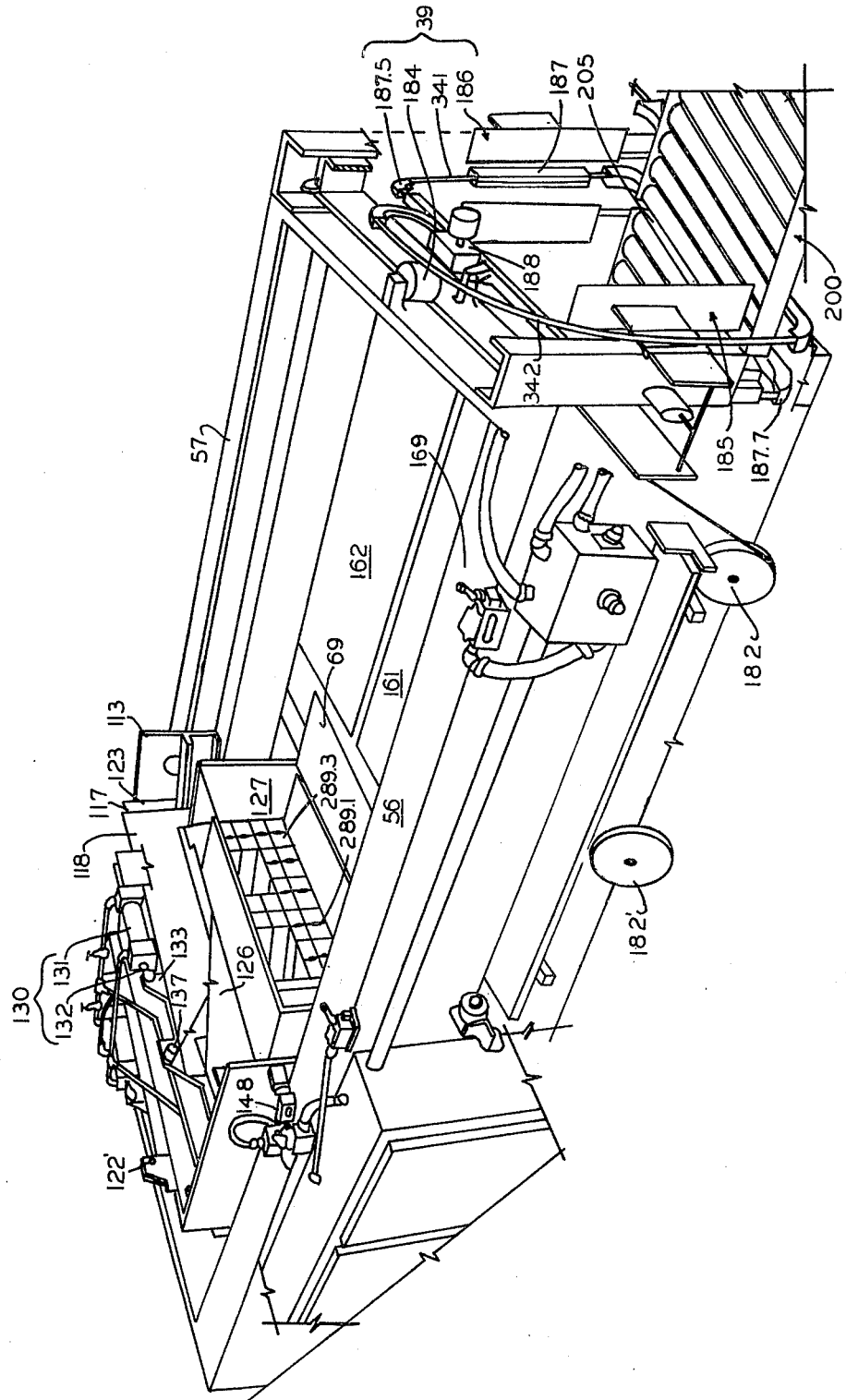
FIG. 11 is an oblique pictorial view of apparatus 33 in a view along direction of arrow 11A of FIG. 10 (generally as shown in FIG. 9) and in the position of parts of apparatus 33 shown in FIG. 10.

The tier elevator is movable from its lower position with its top surface 97 co-planar with the top surface (98) of plate 86, as shown in FIGS. 7 and 8, to an upper position shown in FIGS. 10 and 11, whereat the upper plate surface 97 is co-planar with the top of frame middle cross member plate 69; the movement of plate 90 is controlled by hydraulic fluid sent to cylinder 92 under control of stepped hydraulic control 34.

Sequential control 34 comprises a series of hydraulic valves 201 supported on frame 50 (see FIG. 4) that are electrically actuated by a stepped electrical circuit 202 and operatively connected to a source of electrical power 49 and to a source of hydraulic fluid under pressure 44 and to the piston cylinders actuating the moving portions of subassemblies 35–39 so that the movements of those subassemblies herein described occur in automatic sequence once the movement of bricks from accumulator plate 86 to tier plate 90 is initiated.

The trolley and the clamp subassembly 37 comprises left trolley guide 100 on the left side and 101 on the right side of frame 55, a movable trolley frame 110 and trolley clamp and piston assemblies 120, 121, 140 and 140' and trolley movement piston assembly 145.

Figure 13:
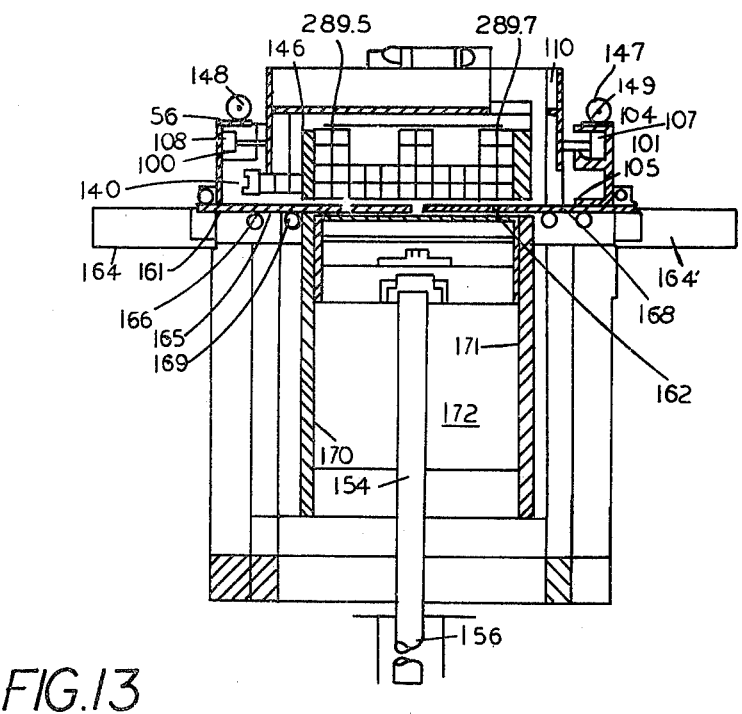
FIG. 13 is a transverse vertical section along the plane 13A—13A of FIG. 12 showing the position of parts of apparatus 33 during the stage of operation shown in FIG. 12.

The frame member 56 includes trolley guide 100 and frame member 57 includes the trolley guide 101; frame member 57 is an E-shaped rigid member which has a vetical wall 102, a horizontal centrally extending upper flange 104 and a lower horizontal centrally extending flange 105 and an intermediate trolley guide flange 101. Member 56 is a mirror image of member 57, as shown in FIG. 13, and supports guide flange 100. The wheels as 108 on front and 107' and 108' on rear of the trolley frame are rollably located on the left intermediate horizontal trolley guide flange 100 and the right horizontal trolley guide flange 101, as shown in FIG. 13, and are supported on axles located on members 112 and 113 of frame 110.

Figure 9:
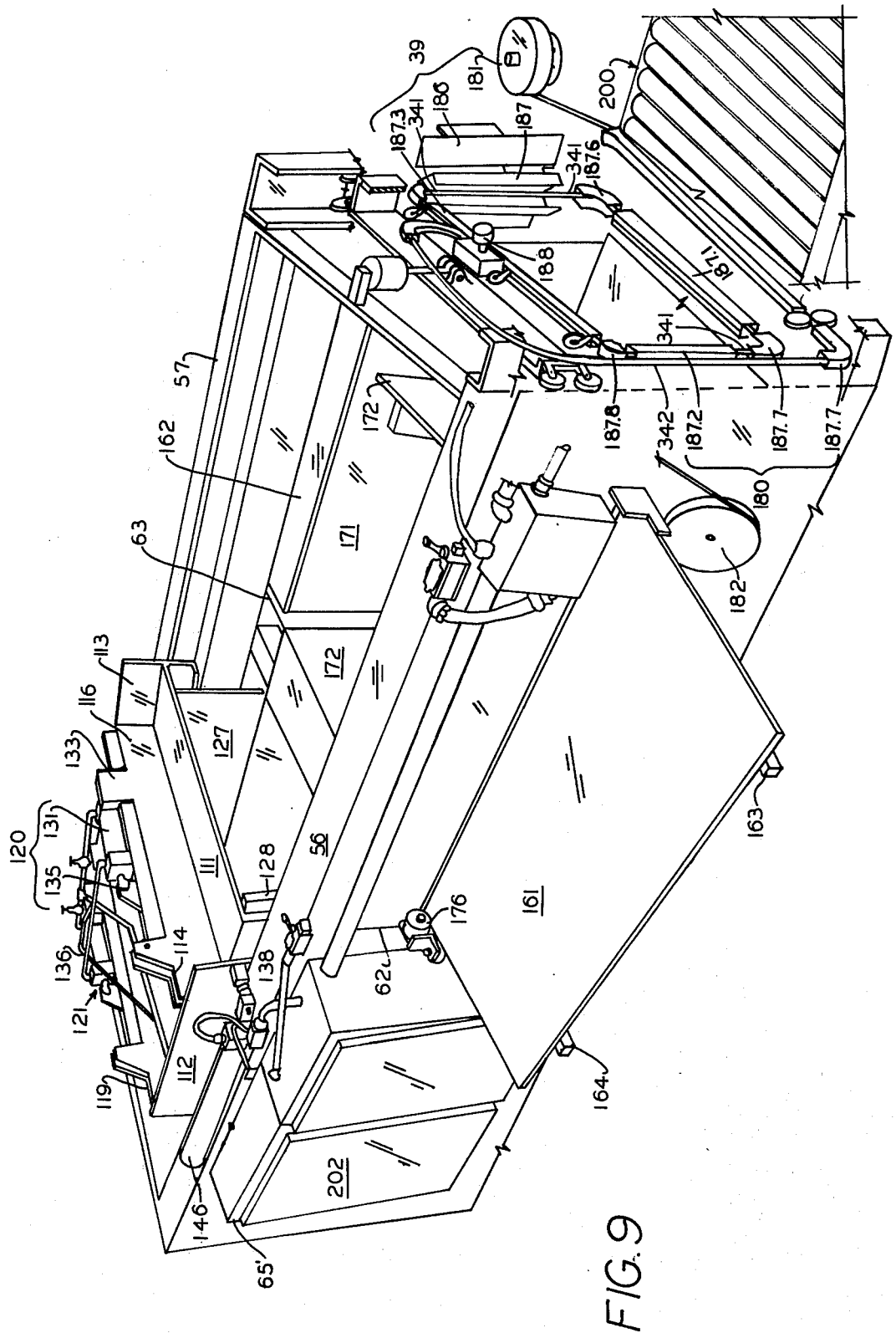
FIG. 9 is a oblique downwardly and rearwardly directed view along the direction of the arrow 9A of FIGS. 4 and 8 to show the interior structure of assembly 33 in a perspective and pictorial form in the stage of operation shown in FIG. 8 for apparatus 33.

The trolley frame 110 comprises a rigid horizontally extending base plate 111, a vertical rigid longitudinally extending left side base member 112 and a vertical rigid horizontally extending right side base member 113. The horizontal base plate 111 is joined at its left and right edges firmly to the vertical side members 112 and 113. The base plate 111 supports at its top a front pair of vertical clamp support plates 115 and a like rear pair of vertical clamp support and guide plate 119 that extend upwardly therefrom. The front plate pair 115 is composed of a rigid vertically extending flat plate 116 at the front (or east as shown in FIGS. 9 and 11) and a similarly vertically extending flat rigid plate 117 parallel to and spaced rearwardly away from the plate 116; plates 116 and 117 are each firmly attached at their bottom edges to the top of the base plate 111 and at their left side edges to the vertical left side plate 112 and at their right edges to the vertical right side plate 113. A groove or slot 114 is located in plate 111 near the right side thereof between the rear edge of the front plate 116 and the front edge of the rear plate 117 to accomodate the downwardly projecting leg of a rigid vertical movable clamp plate 118. The rear pair of clamp and guide plates 119 is similarly formed of front, rear and intermediate located movable plates; the description is given of the front plate pair inasmuch as the operation and structure of the front and rear pairs are the same.

The trolley frame 110 supports a front top clamp assembly 120 on plate pair 115 and a rear top clamp assembly 121 similar thereto on the rear plate pair 119 and a pair of lower clamp cylinder assemblies 140 and 140' and a part of a trolley movement piston assembly 145. Assembly 145 is operatively attached to the trolley side members 112 and 113 and frame 55.

The top trolley clamp assembly 120 on the front pair of clamp support and guide plates 115 comprises an L-shaped movable clap member 118 having a downwardly turned leg 123. The leg extends through a groove 114 therefor in the plate 111 and the leg is firmly attached to a vertically extending rigid vertical right trolley clamp blade 127. Referent numerals for the components of trolley clamp assembly 121 on the rear plates 119 are indicated by a prime (') added to the same referent numeral as is applied to a similar part on the front plates; thus, rear movable L-shaped plate clamp 118' has the same structure as the plate clamp member 118. The similarly movable L-shaped movable plate 118' in the rear pair of vertical clamp support and guide plates 119 has a downwardly extending leg 123' which is similarly attached to the outer edge and surface of the lower right clamp blade 127 as shown in FIG. 8. The blade 127 is flat and rigid and vertical and cooperates with the movable left trolley clamp blade 128 to engage and hold a mas of bricks therebetween.

A top front trolley clamp piston assembly 120 comprises a horizontal piston cylinder 131 and a movable piston shaft 132 therein. The piston cylinder 131 is (see (FIGS. 11 and 12) attached to a rigid bracket 133; bracket 133 is firmly attached to the front and rear plates 116 and 117 of the front pair (115) of clamp support and guide plates. The movable piston shaft 132 is attached to a bracket 134 which is firmly attached to the movable L-shaped plate 118. Rollers as 122 supported on plate pair 115 (and rollers 122' on plate pair 119) provide for smooth transverse movement of the plates 118 (and 118').

Each of the front and rear vertical plates 116 and 117 (like similar plates 116' and 117' on the rear pair of plates 119) has a downwardly extending fixed leg attached to left plate 112 to which a lower front left side piston assembly 140 (not shown) is attached at the front. The lower rear trolley clamp cylinder assembly 140', like 140, comprises the horizontally and transversely directed piston cylinder 142' with an extensible piston shaft 144' therein: a vertical rigid left lower clamp assembly blade 128 is firmly attached to that piston shaft 144' and also to a similar shaft (144) frontwardly thereof attached to a front similar piston (140). The pistons 142, 142', 131 and 131' are operatively connected to the source of hydraulic power 44 and control assembly 34 so that when elevator 90 reaches level of cross member plate 69 as in FIG. 10 the assemblies 120 and 121 are actuated automatically to grasp the bricks supported on tier elevator surface 97.

Figure 12:
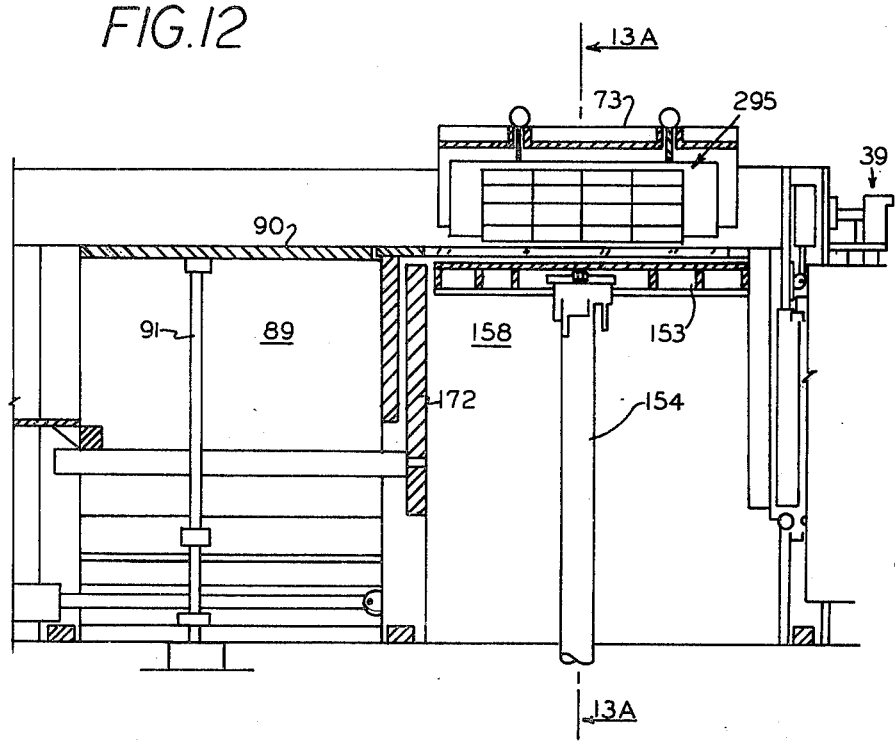
FIG. 12 is a vertical longitudinal sectional view of apparatus 33 in the position of parts subsequent to their position shown in FIGS. 10 and 11 wherein the trolley and clamping subassembly 37 has moved from above the tier elevator chamber to above the cube elevator chamber while the closing plates 161 and 162 are still in closed position.

The trolley movement piston assembly 145 comprises a left and right piston cylinder 146 and 147 extending longitudinally of upper frame 55 and attached thereto at their rear ends (shown in FIGS. 4 and 9) and piston shafts 148 and 149 longitudinally respectively extensible therefrom and attached to sides of trolley frame member 112 and 113, respectively, at brackets 138 and 139, respectively. The piston cylinders are operatively connected to source of hydraulic power 44 and the stepped hydraulic switches 202 so that, after clamping of brick mass between plates 127 and 128 as in FIGS. 11 and 10, the shafts 148 and 149 are automatically extended and the trolley 37 and such clamped and carried bricks are automatically moved along guide flanges 101 and 100 from above the tier elevator chamber 68 to above the cubing elevator chamber 158, as shown in FIG. 12.

The cubing elevator subasembly 38 comprises a cubing elevator 150, a cubing elevator chamber 158 and a cubing elevator protective plate assembly 160.

The cubing elevator comprises a hydraulically controlled cubing elevator upper surface and means for controllably raising and lowering it in the chamber 158. The cubing elevator has an upper surface 151 which is flat and horizontal and may be a rigid flat smooth metal surface or, in the preferred embodiment, comprises a rigid horizontal frame 153 which is firmly fixed to a vertically movable and extending piston shaft 154 while horizontal rollers 152 extend transversely of the length of the frame 153.

The vertical piston shaft 154 is movably supported in a hydraulically actuated cubing elevator piston cylinder 155. The piston cylinder 155 is firmly located in a well 156 located below the floor of the cubing elevator.

The cubing elevator chamber comprises a rigid imperforate vertical smooth surfaced left side wall 170 and a rigid imperforate rigid smooth surfaced right side wall 171 which are fixed to the frame 50 at the members 62 for left side wall 170 and members 61 and 63 for the left side wall 171. A vertically extending movable transverse rear wall 172 is located to the rear and slightly above the top surface of the cubing elevator plate 151 in position of parts shown in FIG. 7. That vertically extending transverse surface is a front surface of a rigid steel plate that is firmly attached to two like parallel pistons 173 and 173'. Each piston shaft as 173 is movably located in a piston cylinder as 174 that is horizontal and firmly attached to the frame 50 between members 63 and 65 and below the tier elevator plate 90 to provide for movement of that rear wall 172 from the rearward position shown in FIG. 7 to the forward position thereof shown in FIGS. 8 and 9 to discharge the finished cube from the top of the cubing elevator surface 151 stagewise into the strapping or banding assembly 39 through the passage formed between frame members 60, 62 and 58 and conveyor 200; rollers 60A and 62A are located centrally of vertical members 60 and 62 and provide a smooth rolling surface for passage of the masses of brick moved therepast by rightward (as shown in FIG. 8) movement of plate 172.

The cubing elevator upper surface 151 is moved by the vertical piston assembly 154 therefor from a lowest position thereof at the vertical level or height of the top surface of the cubing discharge conveyor 200 to a maximum height that is level with or only slightly above, (as in FIG. 14B) or below the level of the middle frame cross member plate 69 (as shown in FIG. 13); the position of the surface 151 is controlled by the control system 34; piston cylinder 155 is operatively connected to the hydraulic power source 44 through the hydraulic switch assembly 202 for automatic positioning of the surface 151 (via piston 154) in sequence as herein described.

The movements of the piston shafts 173 and 173' connect to the rear movable cubing elevator rear wall 172 and provide for movement of the completed hack of bricks as shown in FIG. 8 onto a discharge conveyor 200.

The cubing elevator protective plate assembly 160 comprises left and right horizontally extending and movable rectangular, upwardly smooth flat rigid protective plates 161 and 162. Each of the plates 161 and 162 is alike and is a mirror image of each other, accordingly, the description of plate 161 applies to plate 162 except that the structure relating to plate 162 corresponding to the named structures for plate 161 — as arms 163 and 164 — are indicated by a prime by their referent number. The elevator plate protective plate assembly comprises a laterally projecting front protective plate support arm 163 abreast of the front end of chamber 158 and firmly attached to member 60, and, abreast of rear of chamber 158, a rear left plate support arm 164. A rack and pinion gear assembly 169 is provided to actuate the movement of the plates 161 and 162 from the open position thereof shown in FIG. 9 to the closed position thereof shown in FIG. 11 and vice versa. The assembly 169 includes racks 165, 165', 167 and 167' and pinions 166, 168, 166' and 168'; a left rear pinion gear 166 is rotatably located on frame 50 at top of support beam 62 below level of cross member plate 69 and is operatively connected to a rack 165 at bottom surface of plate 161 near its rear edge. A lower support wheel 177 is located on frame 50 lateral of the cubing elevator chamber wall 170 and at level of bottom of plate 161 to support it in a level position when in closed position, as shown in FIS. 11, 13 and 14A. A lateral roller 176 also bears on top surface of plate 161 to keep it level when closed. Similar rollers to 176 and 177 are provided at the front end of plates 161 and 162 and on rear end of roller 162, e.g., a similar rack pinion 166' is located on the rear right protective plate 162 and a pinion is similarly attached onto the frame 50 to rotate together with the pinion 166 to move the right plate 162 to its open and closed position.

The banding assembly 39 is comprised of a transverse wrapping strap supply 181, a longitudinal web supply 182 on the left frame wall and a longitudinal web supply on the right wall 183 to supply webbing material to the successive longitudinal portions 195, 196, 197, 198 of the completed hack 48.

The strapping assembly also comprises a hydraulic top press 184, a hydraulic left side press 185 and a right side press 186 which serve to compress the sides of the cubed mass and keep it compressed while a strapping machine encircles such mass with a strap and automatically applies a band to the thus produced stably transportable unit.

In an exemplary operation of apparatus 30, each of a plurality of concrete prisms A–R (which prisms are bricks or blocks) are first located in an array 164 of 18 bricks arrayed in three rows of vertically extending blocks A–R, each row having six such vertical prisms or bricks. Each such group or array 164 is passed along kiln discharge conveyor 261 to the turning subassembly 31 and is there put into a horizontal position on the conveyor belt 234 of the turning assembly 31 and transferred to belt 276 of conveyor assembly 32. The resulting array 289 with each of the bricks or prisms with its longitudinal axis extending horizontally and generally parallel to its neighboring brick of the group is conveyed to discharge end of the conveyor 32 with concurrent abrasion of vertically adjacent horizontal surfaces of the bricks in such groups.

For purposes of forming the bottom tier group 47 of cube 48, the operator 300, located adjacent control panel 77 and 89 and behind or west of beam 66 and south or to the left of the discharge end of conveyor 32, moves some members of the array 289 (I, L, and O of FIG. 20) to positions thereof shown in FIG. 1 (I and L over C and F and O over R) to provide the voids or holes 218 and 219 in the finished hack 48 for reception of forktruck arms as shown in FIG. 19. The push-on blade switch control 77 is operatively connected to the electromagnetic switches in control center 202 that are operatively connected to hydraulic valve control assembly 201 and piston cylinder 74 in order to move the blade 73 towards or away from plate 87 on the accumulator assembly.

After such arrangement of array 289.1, as shown in FIG. 2, the push-on blade 73 is used to move two at a time of arrays as as 289.1, such as 289.1 and 289.2 in FIG. 6, onto the plate 86 following which two arrays 289.3 and 289.4 which are mirror images of 289.1 and 289.2, are similarly subsequently formed from arrays as 289 that are moved to the roller section 379 at the discharge end 279 of conveyor 32 beyond belt 276 and then moved therefrom under the control of the operator 300 by blade 73 onto plate 86 as were arrays 289.1 and 289.2. Arrays 289.1 and 289.2 are alike as are 289.3 and 289.4; 289.1 and 289.3 are mirror images of each other as are arrays 289.2 and 289.4; thereafter, arrays 289.5 through 289.8 (corresponding to arrays 289.1 through 289.4, respectively) are similarly formed on section 379 of conveyor 32 and similarly moved to plate 86 by blade 73 to form a mass 290 on the accumulator plate 86 and arrayed as pictorially shown in FIG. 6. FIG. 6 illustrates the misalignment or lack of parallelism of the bricks in the top layer of the arrays 289.1 through 289.8. The bricks of mass 290 below such top layers are also similarly misaligned or not parallel (as is also shown in FIG. 6) and the horizontally and vertically adjacent bricks of mass 290 are not at uniform distances from the vertical plates 81 or 87, as shown in FIG. 6.

On the accumulator plte 86, the eight like but misaligned loose arrays as 289.1 through 289.8 are compressed against the flat vertical rigid stop plate 87 by the flat vertical rigid blade 73 and thereby aligned against those plates. During this compression, the top surfaces of each brick of the bottom layer as 291 of each array as 289.1, which bottom layer of bricks is supported on top of surface 86, as shown in FIGS. 7 and 5, rubs against the bottom surface of the adjacent brick in the layer, as 292, immediately thereabove; such rubbing or movement causes abrasion that removes the contacting protruding weak zones between such brick surfaces.

Following such compression and alignment, one light (⅛ inch thick) wooden board as 293 is then placed over the arrays 289.1 and 289.3, and other like boards 293', 293'', 293''' are placed across the top members of arrays 289.2 and 289.4; 289.5 and 289.7, 289.6 and 289.8, respectively.

The resulting compressed, aligned and covered mass, 295, is contacted by the forwardly moved (rightwardly in FIGS. 7-11 or eastwardly in the embodiment as above described) plate 81 onto the plate 90 of the tier elevator assembly. During such motion, the adjacent vertical surfaces of bricks in layer 291 rub against each other forcefully and the vertical surfaces of bricks in layer 292 rub against each other forcefully and abrade contacting protruding surface portions and remove any such weak portions (as such bricks are irregular in overall geometric shape as well as increments of outline).

The movement of blade 81 also compresses the mass 290 longitudinally, i.e. in direction of movement of the plate 81. The resultant mass, 295, is thus compressed in direction of movement (north-south) of blade 73 as well as (east-west) direction of movement of plate 81 as well as that the adjacent vertical surfaces and adjacent horizontal surfaces of the lower layers 291 and 292 abrade each other and remove weak contact areas therebetween.

The bottom layers 291 and 292 of each of the small groups as 289.1 and similar layers of groups as 289.2, 289.3 and 289.4, 289.5, 289.6, 289.7 and 289.8, as 291' and 291'', form the overall bottom layers 321 and 322 of the completed hack 48.

After location of all the mass 295 on surface 97, tier elevator is programmed to then automatically rise by extension of the piston shaft 91 so that tier elevator surface 97 rises to vertical level of top of cross member plate 69 carrying the mass of brick 295 and boards 293–293'''. On reaching such level, a common feed line 136 passes hydraulic fluid under pressure to all clamping cylinders 131, 131', 140 and 140' on the trolley frame 110, hence pressure is applied concurrently and equally to all pistons actuating plates 127 and 128 to clamp the brick on tier elevator 90 so that the mass 295 on surface 97 and earlier formed against accumulator plate 87 is not disrupted laterally and a drive [to the pinion gears as 166 and 166'] is actuated to close the plates 161 and 162, as shown in FIG. 11. Such clamping of mass 295 prevents relative movement of the theretofore compressed mass of bricks so clamped during their transfer to above cubing chamber 158, which transfer is initiated following movement of assembly 73 to position shown in FIG. 12. At the time of or immediately prior to the clamping of the trolley clamps [and any movement of the E-shaped group of bricks 295 to above the cubing elevator] plates 161 and 162 are automatically driven to their closed positions, as shown in FIG. 11, by movement of [the pinion gears as 166 and 166' on the racks of] plates 161 and 162. When the positioning of the protective plates 161 and 162 is complete, as indicated, for instance, by an appropriate rise in pressure, and pilot valve action that actuates a power valve which — on actuation — passes high pressure fluid to the piston chamber operatively connected to the element next to be actuated in the sequence of operation of apparatus 33, the cubing elevator 150 is then automatically raised by actuation of the hydraulic piston therefor (155) until its top surface 151 is slightly (¼ to ¾ inch) below the bottom of the plates 161 and 162, and horizontal, as shown in FIGS. 12 and 13.

After closure of the protective plates 161 and 162 and raising of the cubing elevator, as in FIG. 13, the trolley movement cylinders 146 and 147 are automatically actuated and the pistons 148 and 149 extend and the trolley frame 110, with the brick mass 295 firmly held thereby, is moved along length of frame 50, with rollers as 107, 108 rolling along guide flanges 100 and 101 until the frame 110 is located entirely over cubing elevator and cubing chamber 158, as shown in FIG. 12.

The bottom surface of the bottom brick layer 311 then is located slightly above the protective plates 161 and 162 — about ¼ to ¾ inch in the preferred embodiment herein described —; any bricks not carried entirely by the engagement of clamps 127 and 128 are supported by the plates 161 and 162; for this purpose plates 161 and 162 are located sufficiently close to the bottom of the layer 311 — ¼ to ¾ inch in the preferred embodiment — that no substantial loss in spacing of bricks on either side of any displaced brick occurs by even a complete displacement of a brick, which rarely occurs, and is especially rare during transfer of the bricks forming the bottom group 45 of the hack 48 because only two layers are then clamped (321 and 322).

After the trolley assembly 37 is in position as shown in FIG. 12 and sensed by sensor arm as 169, protective plates 161 and 162 are automatically driven laterally, as shown in FIG. 14A, to fully expose the flat bottom surface 296 of layer 311 to the cubing elevator surface 151.

The substantially flat cubing elevator floor 151 is then brought upward into contact with the bottom surface of the mass of brick 295 carried by the trolley clamps 127 and 128 and makes contact with flat bottom surface 296 smoothly and without vibration to disrupt or harm the relative location of the bricks in the trolley clamp. The method by which this transfer contact is effected that the pressure in the piston 155 which drives cubing chamber elevator surface 151 has a pressure release which cuts off the power to drive such cube elevator further upward when elevator surface 151 has made an adequately firm contact with the mass of bricks held by the trolley clamp, as shown in FIG. 14B.

Figure 15C:
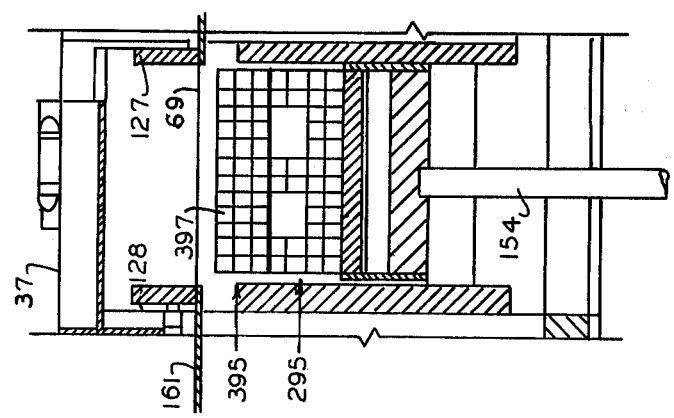
FIGS. 15A, 15B and 15C are a sequence of transverse sectional views as in FIG. 13 showing successive positions of the cubing elevator 150, the protective plate assembly 160 and the masses of bricks subsequently forming the lower group 45 and the middle group 46 of the completed hack 48 during period of operation of the apparatus 33 during and following discharge of the bricks forming the middle group 46 from the trolley clamp subassembly to top of bricks on the cubing elevator.
Figure 15B:
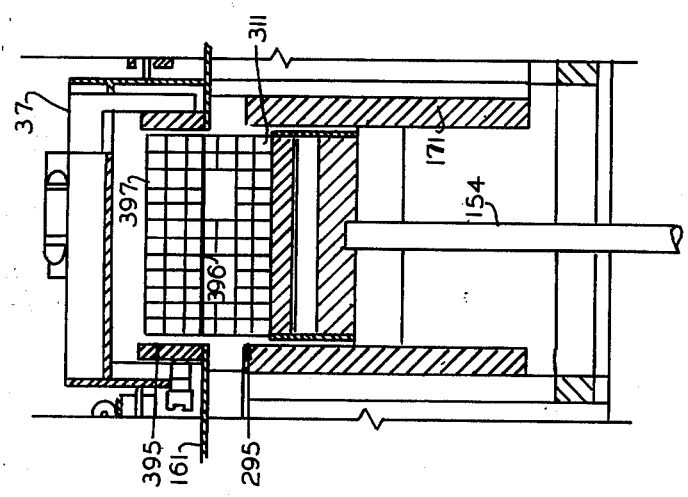
Figure 15A:
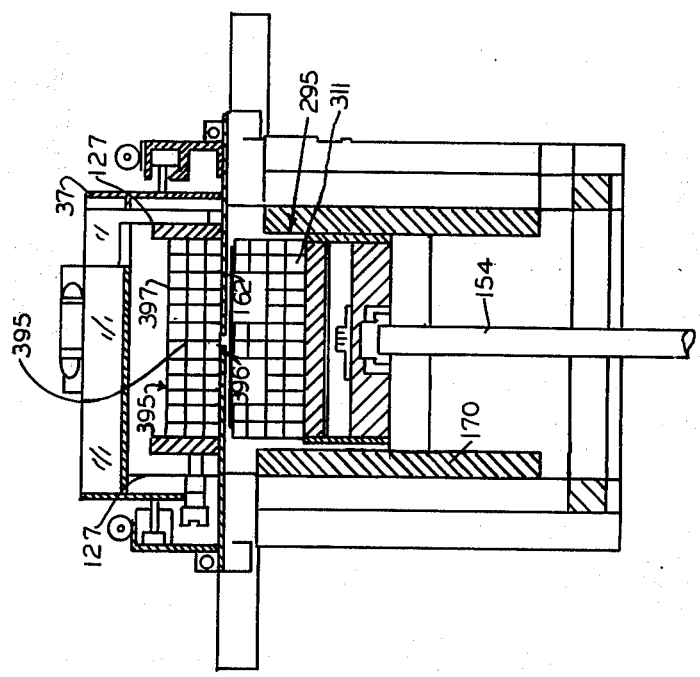

There is some space above the wheels 107 and 108 between flange 100 and upper flange 104 so that pressure on the brick clamped between plates 127 and 128 may lift the trolley assembly without damage thereto. Accordingly, apparatus 33 provides that the first group of bricks, 45, (comprised of the four bottom horizontal layers 321–324 of the future hack of bricks 48) is moved onto the cubing elevator without transverse longitudinal or vertical change in position of the bricks in base layers as 321 and 322 or the rather loosely extending vertical bricks, as F, D, L, I. O and R that surround the orifices 218 and 219 in the future hack 48, as shown in FIG. 14B. The cubing elevator 151 then is moved downwardly and carries the mass 295 downwardly past the open plates 161 and 162, as shown in FIG. 14C, to a level whereat the top level (297) of the mass 295 and the boards 293, 293', 293'' are below the vertical level of the bottom of plates 161 and 162, as is shown in FIG. 15A: following which, as illustrated in FIG. 24, the trolley assembly 37, with clamps 127 and 128 in their expanded position (as shown in FIGS. 12 and 14C) is returned to its position over tier chamber 68, as shown in FIG. 7, by actuation of fluid in cylinders 146 and 148 to drive pistons 147 and 149 to their retracted position.

The vertical plane of stop plate 87 is parallel to the vertical plane of clamps 127 and 128 of clamp of trolley assembly 37 and walls 170 and 171 of cubing assembly 150. The clamp plates 127 and 128, in their open position, extend to positions wider than the north-south spacing of plates 170 and 171 with right clamp plate 127 further north than cubing chamber plate 171 and left clamp plate 128 further south than cubing chamber wall 170. In the closed position of clamp plates 127 and 128, the vertical planes of those plates are within the space defined by walls 170 and 171 of cubing chamber 158 with a ½ inch to 1 inch space between the left cubing chamber wall 170 and the vertical plane of left clamp plate 128 and a ½ to 1 inch space (measured north-south) between the plane of the right clamp plate 128 and right cubing chamber wall 171 whereby to confine the mass transferred by the above described movement from the trolley assembly to the cubing chamber against transverse and longitudinal movement and preserve the relations of the bricks in layer 321 on the cubing elevator surface from receipt (FIG. 14B) to discharge (FIG. 8) therefrom.

During travel of each mass as 189 from the assembly 31 to the assembly 33, the vertically adjacent horizontal surfaces abrade each other because movement of the bricks along the belt 276, which belt is supported on rollers, results in vertical vibration of the brick mass as a whole and longitudinal and transverse movement of its components relative to each other as such mass 189 moves along the belt conveyor 276; such longitudinal motion causes abrasion of protruding portions of the horizontal surfaces between the vertically adjacent bricks and causes removal of the smaller protuberances on such horizontal surfaces therebetween that would be mechanically unstable on application of compressive stresses between such vertically adjacent bricks. Such abrasion is indicated by the large quantities of visually observable dust that are usually discharged from the discharge end of the conveyor belt 276 of the conveyor subassembly 32. Such abrasion of such horizontal surfaces may be enhanced by vertical vibrators applied to the horizontal frame members 273 and 273' of the conveyor assembly 32.

The conveyor assembly includes a portion 379 that has an upper surface composed of substantially contiguous narrow (2 inch diameter) cylindrical horizontally extending rollers rotatably mounted about axis transverse to length of conveyor 32 in a plane with an upper surface co-planar with the top surface of the driven belt 276; portion 379 extends from adjacent to the easterly (as shown in FIGS. 1 and 3) end of belt 276 to the west end of apparatus 33 and extends, as shown in FIGS. 1, 3 and 4, parallel to plate 87 and to front (east) end of plate 86.

In the next stage of exemplary operation of apparatus 30, each of second small group of concrete prisms as A-R are first located, as were the array 164 of 18 bricks, also arrayed in spaced apart relation in three rows of vertically extending blocks as A–R, each row spaced apart from the other and having six such vertical prisms or bricks; each of such second group of prisms is serially passed along kiln discharge conveyor 261 to the turning subassembly 31 and is there compressed longitudinally and laterally and put into a horizontal position on the conveyor belt 234 of the turning assembly 31 and transferred to belt 276 of conveyor assembly 32. Each of the resulting series of arrays 389.1 and 389.2 is identical to 289 with each of the bricks or prisms of such groups with its longitudinal axis extending horizontally and generally parallel to its neighboring brick of the group and is conveyed to roller table 379 and discharge end 279 of the conveyor 32 with concurrent abrasion of adjacent horizontal surfaces of the bricks in such groups.

For purposes of forming the middle brick tier group 46 of cube 48, the operator 300, located adjacent control panel 77 and 89 and behind or west of beam 66 and south or to the left of the discharge end of conveyor 32, moves four of the next thus formed like second arrays as 389.1, 389.2 (shown in FIG. 8) and 389.3 (shown in FIG. 15) and 389.4 (not shown) adjacent each other on the conveyor 32, as shown for 389.5 – 389.8 in FIG. 10.

After such arrangement of like arrays 389.1–389.4 and 389.5–389.8, as shown in FIG. 8, for 389.5–389.8 — each 3 layers high — the push-on blade 73 is used to move two or four at a time of arrays as 389.1 such as 389.1–389.4, onto the plate 89 following which four arrays 389.5–389.8 are moved therefrom under the control of the operator 300 by blade 73 onto plate 86 as were arrays 389.1–389.4 to form a mass 390 on the accumulator plate 86. The bricks of mass 390 are not parallel (as are bricks of mass 290 shown in FIG. 6) and the horizontally and vertically adjacent bricks of mass 390 are not at uniform distances from the vertical plates 81 or 87, generally also as shown in FIG. 6.

On the accumulator plate 86, the eight like but misaligned loose arrays as 389.1–389.8 are compressed against the flat vertical stop plate 87 by the flat vertical blade 73 and thereby aligned at least partially against those flat rigid parallel vertical plates. During this compression, the top surfaces of each brick of the bottom layer of each array as 389.1, which bottom layer of bricks is supported on top of surface 86, rubs against the bottom surface of the adjacent brick in the layer immediately thereabove; such rubbing or movement causes abrasion that removes the contacting protruding weak zones between such brick surfaces. The resulting compressed and aligned mass, 395, is contacted by the forwardly moved (rightwardly in FIGS. 7–11 or eastwardly in the embodiment as above described) plate 81 onto the plate 90 of the tier elevator assembly. During such motion, the adjacent vertical surface of bricks in each layer as 346 rub against each other forcefully and abrade contacting protruding surface portions and remove any such weak portions (as such bricks are irregular in overall geometric shape as well as increments of outline).

The movement of blade 81 also compresses the mass 390 longitudinally, i.e. in direction of movement of the plate 81. The resultant mass, 395, is thus compressed in direction of movement (north-south) of blade 73 as well as (east-west) direction of movement of plate 81 as well as that the adjacent vertical surfaces and adjacent horizontal surfaces of the mass abrade each other and remove weak contact areas therebetween.

The bottom layers of each of the small groups as 389.1 and similar layers of small groups 389.2, 389.3 and 389.4, 389.5, 389.6, 389.7 and 389.8, form the overall bottom layer 346 of tier group 46 of the completed hack 48.

After location of all the mass 395 on surface 97, tier elevator 90 is programmed to then automatically rise by extension of the piston shaft 91 so that tier elevator surface 97 rises to vertical level of top of cross member plate 69 carrying the mass of brick 395 and board. On reaching such vertical level, the common feed line 136 passes hydraulic fluid under pressure to all clamping cylinders 131, 131', 140 and 140' on the trolley frame 110, hence pressure is applied concurrently and equally to all pistons actuating plates 127 and 128 to clamp the brick of mass 395 on the tier elevator 90.

Such clamping of mass 395 prevents relative movement of the theretofore compressed mass of bricks so clamped during their transfer to above cubing chamber 158, which transfer is initiated following movement of assembly 73 to position shown in FIG. 12. At the time of or immediately prior to the clamping of the trolley clamps and any movement of the solid group of bricks 395 to above the cubing elevator, plates 161 and 162 are automatically driven to their closed positions, as shown in FIG. 11.

After closure of the protective plates 161 and 162 and the trolley movement cylinders 146 and 147 are automatically actuated and the pistons 148 and 149 extend and the trolley frame 110 with the brick mass 395 firmly held thereby, is moved along length of frame 50, with rollers 107, 108 rolling along guide flanges 100 and 101 until the frame 110 is located entirely over cubing elevator and cubing chamber 158, as shown in FIG. 12.

The bottom surface of the bottom brick layer 346 of mass 395 then is located slightly above the protective plates 161 and 162 — about ¼ to ¾ inch in the preferred embodiment herein described —; any bricks not carried entirely by the engagement of clamps 127 and 128 are supported by the plates 161 and 162; for this purpose plates 161 and 162 are located sufficiently close to the bottom of the layer 346 — ¼ to ¾ inch in the preferred embodiment — that no substantial loss in spacing of bricks on either side of any displaced brick occurs by even a complete displacement of a brick, which rarely occurs.

After the trolley assembly 37 is in position, as shown in FIGS. 12 and 15A, the protective plates are automatically driven laterally (as shown in FIG. 14A for those plates) to fully expose the flat bottom surface of layer 346 to the top surface of the boards 293, 293', 293" and 293''' on the top surface (297) of the mass 295; such boards provide a smooth and relatively flat but non-rigid surface extending from 1 inch of the right lateral side of mass 295 to 1 inch of the left lateral side thereof (the left side of resulting portion 45 is shown in FIG. 18). The mass 295 below the boards is supported on the cubing elevator 150.

The cubing elevator 150 is then automatically supported by the hydraulic piston shaft therefor 154 with the horizontal elevator upper surface (or floor) 151 in contact with the flat bottom surface of bottom layer (311) of brick of mass 295 and with the upper surface of mass 295 not flat or smooth from one (left) side to the other (right) side thereof and with boards 293, 293', 293" and 293''' above the portions of the mass 295, as shown in FIGS. 10, 13 and 14A–C and the top surfaces of the boards 293, 293', 293", 293''' slightly (¼ to ¾ inch) below the bottom of the bottom surface of plates 161 and 162, and horizontal, as shown in FIG. 15A.

After such opening of plates 161 and 162 (after position as shown in FIG. 15A) and while the mass 395 is supported by trolley clamp plates 127 and 128 (as above described for mass 295) the cubing elevator floor 151 is brought a small distance upward by piston 154. By such small vertical movement of piston 154, the upper surface of boards 293, 293', 293" and 293''' are brought into contact with the bottom surface of the mass of brick 395 carried by the trolley clamps 127 and 128 and make a supporting contact with bottom surface 396 of mass 395, as shown in FIG. 15B, with a minimum of as would disrupt or harm the relative location of the bricks in the trolley clamp. This transfer contact is also effected automatically by that the pressure in the piston cylinder 155 which drives cubing chamber elevator surface 151 has a pressure release which cuts off the power to drive such cube elevator further upward when the elevator has made an adequately firm contact with the mass of bricks held by the trolley clamp, as shown in FIG. 15B.

There is some space above the wheels 107 and 108 between flange 100 and upper flange 104 so that pressure on the brick mass 395 clamped between plates 127 and 128 (as with mass 295) may lift the trolley assembly 37 without damage thereto. Accordingly, apparatus 33 provides that the second group of bricks, 46 (comprised of the fifth, sixth and seventh horizontal layers from the bottom of the future hack of bricks 48 shown in FIGS. 17 and 18) is moved onto the cubing elevator without transverse or longitudinal change in position. The cubing elevator 151 then is moved downwardly and carries the mass 395 downwardly past the open plate 161 and 162, as shown in FIG. 15C, to a level whereat the top level of the mass 395 is below the level of the bottom of plates 161 and 162, as shown in FIG. 16A, following which, as illustrated in FIG. 24, the trolley assembly 37, with clamps 127 and 128 in their expanded position (as shown in FIGS. 12 and 15C), is returned to its position over tier chamber 68, as shown in FIG. 7, by actuation of fluid in cylinders 146 and 148 to drive pistons 147 and 149 to their retracted position.

In the next stage of exemplary operation of apparatus 30, each of third small group of concrete prisms as A-R are first located as were the array 164 of 18 bricks and arrayed in spaced apart relation in three rows of vertically extending blocks as A-R, each row spaced apart from the other and having six such vertical prisms or bricks; each of such third group of prisms is serially passed along kiln discharge conveyor 261 to the turning subassembly 31 and is there compressed longitudinally and laterally and put into a horizontal position on the conveyor belt 234 of the turning assembly 31 and transferred to belt 276 of conveyor assembly 32. Each of the resulting series of arrays is identical to array 389.1, with each of the bricks or prisms of such groups with its longitudinal axis extending horizontally and generally parallel to its neighboring brick of the group and is conveyed to roller table 379 and discharge end 297 of the conveyor 32 with concurrent abrasion of adjacent horizontal surfaces of the bricks in such groups.

For purposes of forming the top brick tier group 47 of cube 48, the operator 300, located adjacent control panel 77 and 89 and behind or west of beam 66 and south or to the left of the discharge end of conveyor 32, moves four of the next thus formed like third arrays, each like 389.1, adjacent each other on the conveyor 32 (as shown for 389.5–389.8 in FIG. 10.).

After such arrangement of four such arrays and each 3 layers high, the push-on blade 73 is used to move two or four at a time of such arrays, each like 389.1, onto the plate 86 following which four such like arrays are moved therefrom under the control of the operator 300 by blade 73 onto plate 86 (as were arrays 389.1–389.4) to form a thick mass like 390 for the top or third tier group 47 on the accumulator plate 86. The bricks of such third mass are as in 390 not parallel and the horizontally and vertically adjacent bricks of such third mass, like mass 390, are not at uniform distances from the vertical plates 81 or 87.

On the accumulator plate 86, the eight like for misaligned loose arrays for the third or upper group 47, are compressed against the flat vertical stop plate 87 by the flat vertical blade 73, like 389.1–389.8 and thereby aligned at least partially against those flat rigid parallel vertical plates. During this compression, the top surfaces of each brick of the bottom layer of each such array, which bottom layer of bricks is supported on top of surface 86, rubs against the bottom surface of the adjacent brick in the layer immediately thereabove; such rubbing or movement causes abrasion that removes the contacting protruding weak zones between such brick surfaces. The resulting compressed and aligned mass, 375, is contacted by the forwardly moved (rightwardly in FIGS. 7–11 or eastwardly in the embodiment as above described) plate 81 onto the plate 90 of the tier elevator assembly. During such motion, the adjacent vertical surfaces of bricks in each layer as 347 rub against each other forcefully and abrade contacting protruding surface portions and remove any such weak portions (as such bricks are irregular in overall geometric shape as well as increments of outline).

The movement of blade 81 also compresses the third mass on plate 86 in the direction of movement of the plate 81. The resultant mass, 375, is thus compressed in direction of movement (north-south) of blade 73 as well as (east-west) direction of movement of plate 81 as well as that the adjacent vertical surfaces and adjacent horizontal surfaces of the mass abrade each other and remove weak contact areas therebetween.

The bottom layers of each of the small groups (like 389.1 but) in the third mass also form the overall bottom layer 347 of tier group 47 of the completed hack 48.

After location of all the third mass 375 on surface 97, tier elevator 90 is programmed to then automatically rise by extension of the piston shaft 91 so that tier elevator surface 97 rises to vertical level of top of cross member plate. 69 carrying the mass of brick 375. On reaching such vertical level, the common feed line 136 passes hydraulic fluid under pressure to all clamping cylinders, 131, 131', 140 and 140' on the trolley frame 110, hence pressure is applied concurrently and equally to all pistons actuating plates 127 and 128 to clamp the brick of mass 375 on tier elevator 90. Such clamping of mass 375 prevents relative movement of the theretofore compressed mass of bricks so clamped during their transfer to above cubing chamber 158, which transfer is initiated following movement of assembly 73 to position shown in FIG. 12. At the time of or immediately prior to the clamping of the trolley clamps and any movement of the solid group of bricks 375 to above the cubing elevator, plates 161 and 162 are automatically driven to their closed positions, as shown in FIG. 11.

After closure of the protective plates 161 and 162 and the trolley movement cylinders 146 and 147 are automatically actuated and the pistons 148 and 149 extend and the trolley frame 110, with the brick mass 375 firmly held thereby, is moved along length of frame 50, with rollers as 107, 108 rolling along guide flanges 100 and 101 until the frame 110 is located entirely over cubing elevator and cubing chamber 158, as shown in FIG. 12.

The bottom surface of the bottom brick layer 347 of mass 395 then is located slightly above the protective plates 161 and 162 — about ¼ to ¾ inch in the preferred embodiment herein described —; any bricks not carried entirely by the engagement of clamps 127 and 128 are supported by the plates 161 and 162; for this purpose plates 161 and 162 are located sufficiently close to the bottom of the layer 347 — ¼ to ¾ inch in the preferred embodiment — that no substantial loss in spacing of bricks on either side of any displaced brick occurs by even a complete displacement of a brick, which rarely occurs.

After the trolley assembly 37 is in position, as shown in FIGS. 12 and 16A, the protective plates are automatically driven laterally (as shown in FIG. 14A for those plates) to fully expose the flat bottom surface of layer 347 to the top surface 397 of the mass 395.

The cubing elevator 150 is then automatically supported by the hydraulic piston shaft therefor 154 with the horizontal elevator upper surface (or floor) 151 in contact with the flat bottom surface of bottom layer of brick of mass 375 and mass 295 and boards 293, 293', 293'' and 293''' on top of mass 295 supporting mass 395 and with the upper surface 397 of mass 395, which is not flat or smooth, slightly (¼ to ¾ inch) below the bottom of the bottom surface of plates 161 and 162, and horizontal, as shown in FIG. 16A.

After such opening of plates 161 and 162 (after position as shown in FIG. 16A) and while the mass 385 is supported by trolley clamp plates 127 and 128 (as above described for masses 395 and 295) the cubing elevator floor 151 is brought a small distance upward by piston 154. By such small vertical movement of piston 154, the upper surface 397 of mass 395 is brought into contact with the bottom surface of the mass of brick 375 carried by the trolley clamps 127 and 128 and makes a supporting contact with bottom surface 376 of mass 375, as shown in FIG. 16B, with a minimum of impact on the trolley clamp. This transfer contact is also effected automatically by that the pressure in the piston cylinder 155 which drives cubing chamber elevator surface 151 has a pressure release which cuts off the power to drive such cube elevator further upward when the elevator has made an adequately firm contact with the mass of bricks held by the trolley clamp, as shown in FIG. 16B.

There is some space above the wheels 107 and 108 between flange 100 and upper flange 104 so that pressure on the brick mass 375 clamped between plates 127 and 128 (as with mass 295) may lift the trolley assembly 37 without damage thereto. Accordingly, apparatus 33 provides that the third group of bricks, 47, comprised of the eighth, ninth and tenth horizontal layers counting from the bottom of the future hack of bricks 48 shown in FIGS. 17 and 18, is moved onto the cubing elevator without transverse or longitudinal change in position. The cubing elevator 151 then is moved downwardly and carries the mass 375 downwardly past the open plate 161 and 162, as shown in FIG. 16C, to a level whereat the top level of the mass 375 is below the level of the bottom of plates 161 and 162, as shown in FIG. 16C, following which, as illustrated in FIG. 24, the trolley assembly 37, with clamps 127 and 128 in their expanded position (as shown in FIGS. 12 and 15C), is returned to its position over tier chamber 68, as shown in FIG. 7, by actuation of fluid in cylinders 146 and 148 to drive pistons 147 and 149 to their retracted position.

The mass 295, 395 and 375 of FIG. 16C is then moved through a strapping assembly 39 by stepwise movement of the wall 172, urged by piston shaft 173 (see FIG. 8); at each stationary position of the combined mass 295-395-375 with a stack thereof as 195, 196, 197, 198, a portion of heavy plastic tape 331-334 is dispensed and held against a corner of the mass while a steel band, as 341-344 is passed around each stack portion, as 195-198, respectively, and is thus tensioned with 200–300 pounds tension before being clamped from the hack, or banded package of brick, 48 (FIGS. 17-19).

The described apparatus 33 is merely exemplary for its function. For instance, the two pistons are used to drive the plate 81 may be replaced by one centrally located piston with a harness, the centrally located piston located below the plate 86 and operative to drive a piston forward and backward underneath the tier elevator with such piston attached to a drawbar which is in turn attached to the plates 82 and 83 to move plate 81. Similarly, the piston used to move the cubing elevator plate 151 may be replaced by a chain attached to each of the sides of such cubing elevator piston. Additionally, the vertically extending piston used to move the cubing elevator plate and the tire elevator plate (90 and 150) may also be replaced by chains and pinion with the pinions driving the chains and the chains attached to the plate and move the plate up and down the height of the cubing elevator or the tire elevator chamber; the rack and pinion drive for the closure plates 161 and 162 may be replaced by a piston which extends laterally and drives the plates 161 and 162 laterally and centrally with two pinions joined by a rigid rod attached to racks on the bottom of plates 161 and 162.

The packaged hack 48 that is passed to the discharge end of conveyor 200 has an overall horizontally extending length 301 and a vertically extending height 302 and a width 303 that extends horizontally and transversely to length 301. Such hack is formed of many prismatically — generally like sized right rectangular prisms in the apparatus 30 illustrated — cementitious or concrete bricks, as 304 in FIGS. 17 and 18. Each brick, as 304, has a length 305 in one direction (FIGS. 17–18) parallel to the length of the hack 48 a width 307 extending in a second direction perpendicular to the length 305 of the hack 48, and a height 306 extending perpendicular to said block or brick width and height and parallel to the hack height. Each of the bricks as 304 is located in a horizontally and transversely extending series or row, as 311, with adjacent vertically extending side faces, as 308 on brick 304 (such side faces are defined by edges extending in direction of length and height of each brick) between members as 304 and 309 and 310 of each such row.

Each of the bricks as 304 and 314 of hack 48 are also located one on top of another in vertical columns as 330 extending parallel to height 302 of the hack 48.

Each one of the horizontal rows as 311 is located horizontally adjacent to another like row of such blocks or bricks as 312 and row 312 is similarly located relative to a row 313 similar to 312 along the direction of the length 301 of the hack and of the brick (305) to form one horizontal layer 321 with outline extending the width and length of the hack 48.

Each of the rows as 311 and 312 and 313 is located with its top surface — or portions thereof — adjacent to the bottom surface of a vertically adjacent row [as 315 for 311, and row 316 for row 312 and row 317 for row 313] along direction of height of the hack 48 and forming vertically elongated rectangular stacks 325, 326 and 327, respectively (FIGS. 17 and 18), each stack having a frontal outline that is the same as that of the height and width of the hack 48.

The layers 321, 322, 323 are located one on top of the other to the height of the stack. The stacks 325–328 present a frontal view as in FIG. 17 and are held together for the length of the hack 48 by strong yet flexible plastic taping lengths 331, 332, 333 and 334 that extend along the upper and lower corners on left and right sides of each stack and extend along the length of the hack and are firmly held by straps 341–344. Stack 327 is like 325–7 and adjacent to 327.

High tensile strength steel strap members 341 and 342 and 343 and 344 encircle and firmly hold the outside perimeter of each of the stacks 325, 326, 327 and 328. On top of the voids 218 and 219, boards 293 (and 293') are placed in each stack as 325 for reception of the forks as 351 and 352 of forktruck 353 whereby the finished strapped hack is transported.

This structure provides that the portions of the vertical faces of the bricks of the bottom layer 321 are in mechanical stable contact only at vertical surface positions theretofore abraded as above and below described. As the surface portions that are in contact were abraded, they provide a stable mechanical transverse functional contact and mechanical connection between the members of row 311 as such row members are stably held in fixed spatial relationship to each other by the banding member, as 341, for each stack as 325. All members of the bottom layer 321 are initially located on a flat surface, the plate surface 234 of turning assembly 31 and thereafter are supported on a flat surface — 276, the end of the conveyor 32, then table 86, the tier elevator and the cubing elevator during movements of such bricks on such surfaces in assemblies 31, 32, 33 and 35 as abrade the side and top surfaces of the members of such bottom layer in directions parallel to and transverse to the length of the bricks. Accordingly, the abrasion of the side surfaces of each of such bricks (on the bottom row) as 308 is effected thereon by the neighboring side surfaces at a constant height in apparatus 30 so that after banding of each stack with all the bottom surface of the bricks forming the bottom row of each stack flat, the abraded surface portions of any one brick side surface do not lose their contacting relationship with side surface of an adjacent brick once created. Accordingly, the bottom layer members contact each other at and only at mechanically abraded vertical surface portions of the adjacent bricks. In contrast thereto, the abraded portions of the side surfaces of the bricks forming the layer above the bottom layer are not always at the same vertical level because — as shown in FIGS. 13–16C — the bottom layers 346 and 347 of the tiers 46 and 47 are supported in cubing chamber 158 on upper surface of the tier therebelow and are not necessarily at the same horizontal level because the upper surfaces of tiers 45 and 46 are not flat, as in the upper surface of the cubing elevator. Accordingly, the banding members as 341 that pass around the bottom row, as 311 of each stack as 325 does not develop any slack notwithstanding subsequent usual handling of the hack 48. The transverse dimensions of the layers of tiers 46 and 47 is not critical to the tightness of the banding member, as 341, of each stack as 325 because the angle from the lateral edge of the bottom layer 321 to the lateral edge of the layers of the tiers 46 and 47 is substantially 90 degrees. The lateral members 335 to 338 of the layers 323 and 324 that include the voids 218 and 219 of tier 45 are readily moved inward on lateral pressure of the clamps of the banding assembly 39 and the members as 348, 349, and 350 of the topmost layer 340 of the hack 48 are readily movable longitudinally as well as transversely with respect to each other whereby to reach the smallest transverse dimension thereof when in the clamping and banding assembly 39, as well as being moved in apparatus 33 as above described so as to effect abrasion of the adjacent vertical side surfaces of bricks forming such uppermost layer so that the banding tape as 341 for each stack as 325 is not loosened by development of non-contacting portions between such bricks, and consequent loss of dimentional stability during subsequent usual handling of the hack 48.

The apparatus 30 disclosed is not limited to use with the particular material or dimension of concrete brick described as an exemplary embodiment as any of a large variety of sizes of like material of like strength may be operated upon by the disclosed apparatus.

In position of mass 375-395-295 of FIG. 8, the strap tightening machine 188 draws each band as 341–344 from the normally spring-loaded closed guides 187, 187.1, 187.2, 187.3 — then in their open position, as shown for 187 in FIG. 9 — and tightens such bands on the mass 48 (375-395-295) and over the theretofore dispensed tapes 331-334. FIG. 9 is broken away to show the position of normally closed guides 187–187.3 and curved normally open guides 187.5–187.8. Each band (as 341) is drawn by machine 188 through slot 205 from the guide 187.1 below conveyor 200 to bottom of mass 375-395-295.

For appreciation of the quantitative aspects of this apparatus, particular dimensions of apparatus and brick are set out in Table I and the drawings of FIGS. 1, 2, 6, 9 and 11 are pictorial and hence approximately to scale, although some (4, 5, 7, 8, 10, 12, 13, 14A–C, 15A–C, 16A–C are diagrammatic and to scale; accordingly, other dimensions or their equivalent are readily calculated therefrom.

TABLE I - DIMENSIONS OF APPARATUS 30

| Assembly 33: | | | |
|---|---|---|---|
| Frame 50: | | | |
| Height (Floor to top of Frame 55) | 6' ½" | | |
| Width Overall | | | |
| Lateral (60–61) | 5' 1" | | |
| Distance from West End of Member 65 to: | | | |
| Lateral of Assembly 39 | 10' 9" | | |
| West end of Member 63 | 4' 6" | | |
| East end of Member 63 | 5' 0" | | |
| East end of Member 60 | 9' 9" | | |
| Guide 72 (North-South) | 4' 7½" | | |
| Plate 86 and Belt 276: | | | |
| Height above Ground | 3' 0" | | |
| Plate 81: | | | |
| Width (North-South) | 2' 8" | | |
| Plate 87: | | | |
| Width (East-West) | 4' 2½" | | |
| Belt 200: | | | |
| Width (North-South) | 2' 10" | | |
| Height off Ground | 20" | | |
| Plate 161 | ½" × 4' × 5' 1" | | |
| Conveyor 32: | | | |
| Length Belt 267 (driven) | 30' | | |
| Roller Length (379) | 11' ½" | | |
| Tier Elevator Plate 90: | | | |
| Length (East-West) | 4' 0" | | |
| Cubing Elevator Surface 151: | | | |
| Length (East-West) | 4' 0" | | |
| Mirror 358 is a convex mirror mounted so that operator may see into cubing elevator chamber 158. | | | |
| Brick 304, A–R: | | | |
| (FIGURES 17, 18 20) | | | |
| Depth or Width 307: | | | |
| End at 211 | 2.688 ± | .001" or | 2-44/64" |
| End at 212 | 2.641 | " | 2-41/66" |
| Length 305 | 9.25 | " | 9¼" |
| Height 306: | | | |
| End at 211 | 3.063 | " | 3-4/64" |
| End at 212 | 3.016 | " | 3-1/64" |
| Group 289: | | | |
| (FIGURES 2, 20) | | | |
| Height (Vertical) | 9 in. | | |
| Length (East-West) | 16 in. | | |
| Depth (North-South) | 9 in. | | |

Hack 48:
(FIGURES 17, 18, 19)

| | |
|---|---|
| Height (302) | 30-3/8" ± ¼" |
| Length (301) | 37" ± ¼" |
| Width (303) | 2' 6½" ± ¼" |
| Tape 331–334: | |
| Width | 2½" |
| Thickness | .020" |
| Steel Bands 341–344: | |
| Width | ½" |
| Thickness | .007" |
| Modulus of Elasticity | 30,000,000 p.s.i. |
| Tensile Strength | 70–80,000 p.s.i. |
| Board 293: | |
| Length | 2' 6" |
| Width | 6½" |
| Thickness | ⅛" |

I claim:

1. Brick handling machinery comprising, in operative combination
   1. first means to move each of a plurality of bricks with a contacting surface portions therebetween in one plane relative to each other in directions parallel to said contacting surface portions and to translate all of said bricks in one direction;
   2. second means to move each of said plurality of bricks with contacting surface portions in a second direction at an angle to said one direction and relative to each other in directions parallel to the plane of said contacting portions, said first means having discharge means connected to said second means;
   3. third means to move each of said bricks in a third direction transversely to said second direction and to move each of said bricks having contacting surface portions relative to each other in a direction parallel to the plane of said contacting surface portions;
   4. fourth means to (a) move said plurality of bricks in a direction different from said third direction in said third means to move and to (b) confine said plurality of bricks against further relative movement while conveying said bricks, said third means having discharge means connected to said fourth means;
   5. fifth means to move said plurality of bricks vertically from said fourth means while limiting further longitudinal and transverse relative movement between said bricks and said fourth means having discharge means connected to said fifth means;
   6. and banding means to band said plurality of bricks; and wherein-
   7. said first means to move said bricks is a conveying and vibrating means for conveying said bricks in one horizontal direction and vibrating said bricks in a plane normal to said one direction, and said second means is a flat horizontal surface with a moving rigid flat vertical blade thereabove operable to move transversely to the length of said conveyor and parallel to said flat surface, and said third means comprises a flat smooth horizontal surface with a moving rigid flat vertical blade thereover operable to move parallel to said surface and transversely to the length of said second means, and wherein said fourth means is a horizontally extending movable elevator with a brick clamping means and is movably supported for longitudinal movement, said clamp means extending vertically and being movable from a lesser clamping spacing therebetween to a greater open distance therebetween, and said fifth means comprises a chamber with a horizontally movable horizontally extending flat surfaced rigid top closure and a vertical movable elevator therebelow, and rigid vertical smooth-surfaced chamber side walls lateral to said elevator and spaced away from each other by a distance greater than the distance of said clamps in their clamping position and less than the distance of said clamps in their open position, said fifth means also comprising a third flat vertical rear rigid wall perpendicular to both of said side walls and operably connected to means to move said third vertical wall in a horizontal direction between said chamber side walls toward said banding means and to move said plurality of bricks into said banding means, and means operable to raise and lower said elevator from a height immediately below a lower edge of said third vertical side wall up to a height immediately below said horizontally movable rigid top closure of said fifth means.

2. Apparatus as in claim 1 including control means operatively connected to said third means to automatically initiate operation of said fourth means upon termination of operation of said third means and operatively connected to said fifth means to automatically initiate operation thereof upon termination of operation of said fourth means.

3. Apparatus as in claim 2 comprising also means for turning the position of vertically elongated spaced apart plurality of bricks to horizontally elongated pairs of bricks with vertical and horizontal contacting surfaces and means for transport of said horizontally elongated pairs of bricks to said first means.

* * * * *